United States Patent
Asami

(10) Patent No.: US 9,295,139 B2
(45) Date of Patent: Mar. 22, 2016

(54) LIGHT CONTROL SYSTEM, LIGHT CONTROL METHOD AND COMPUTER READABLE MEMORY

(71) Applicant: MegaChips Corporation, Osaka-shi (JP)

(72) Inventor: Tomonobu Asami, Izumisano (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/396,909

(22) PCT Filed: Mar. 5, 2013

(86) PCT No.: PCT/JP2013/055964
§ 371 (c)(1),
(2) Date: Oct. 24, 2014

(87) PCT Pub. No.: WO2013/161392
PCT Pub. Date: Oct. 31, 2013

(65) Prior Publication Data
US 2015/0102734 A1    Apr. 16, 2015

(30) Foreign Application Priority Data

Apr. 27, 2012   (JP) .................................. 2012-102630

(51) Int. Cl.
H05B 37/02         (2006.01)
(52) U.S. Cl.
CPC ........ H05B 37/0227 (2013.01); H05B 37/0263 (2013.01); H05B 37/0272 (2013.01)
(58) Field of Classification Search
CPC ..... F21S 8/033; F21V 23/0442; G05B 15/02; G05B 2219/23417; G05B 2219/2642; G08B 13/19628; G08B 13/19645; G08B 13/19673; G08B 13/19695; H05B 37/0227; Y02B 20/44
See application file for complete search history.

(56) References Cited

U.S. PATENT DOCUMENTS

2011/0210672 A1* 9/2011 Yoshii ............... H05B 37/0227
                                                         315/158
2012/0278640 A1* 11/2012 Caglianone ........... G06F 1/3231
                                                         713/323

FOREIGN PATENT DOCUMENTS

CN       102170742 A      8/2011
JP       2008-204897      9/2008

(Continued)

OTHER PUBLICATIONS

International Preliminary Report on Patentability and Written Opinion issued Nov. 6, 2014 in PCT/JP2013/055964 filed on Mar. 5, 2013 (with English translation).
International Search Report issued May 14, 2013 in PCT/JP13/055964 Filed Mar. 5, 2013.

(Continued)

*Primary Examiner* — Seokjin Kim
(74) *Attorney, Agent, or Firm* — Oblon, McClelland, Maier & Neustadt, L.L.P.

(57) ABSTRACT

A plurality of lighting devices are respectively arranged, on a ceiling surface, at a plurality of grid points of the ceiling surface partitioned in a grid pattern. A detection unit detects occupancy statuses of a plurality of seats located correspondingly to positions of the plurality of grid points. A controller is capable of communicating with each of the plurality of lighting devices. The controller includes a light-control information generating unit that regards a block formed of a plurality of grid points centering around a grid point of an occupied location as one group to generate, for each of groups set correspondingly to occupied locations, light control information on a lighting device that becomes a dimming target in the group. The controller also includes a transmission unit that transmits the light control information. The lighting device being a dimming target among the plurality of lighting devices performs light control based on the received light control information.

8 Claims, 21 Drawing Sheets

(56) References Cited

FOREIGN PATENT DOCUMENTS

| JP | 2010-147014 | 7/2010 |
|----|-------------|--------|
| JP | 2011-181274 | 9/2011 |
| JP | 2011-253716 | 12/2011 |

OTHER PUBLICATIONS

Combined Office Action and Search Report with Japanese translation issued on Jun. 3, 2015 in Chinese Patent Application No. 201380022117.3 with English translation.

* cited by examiner

F I G . 7
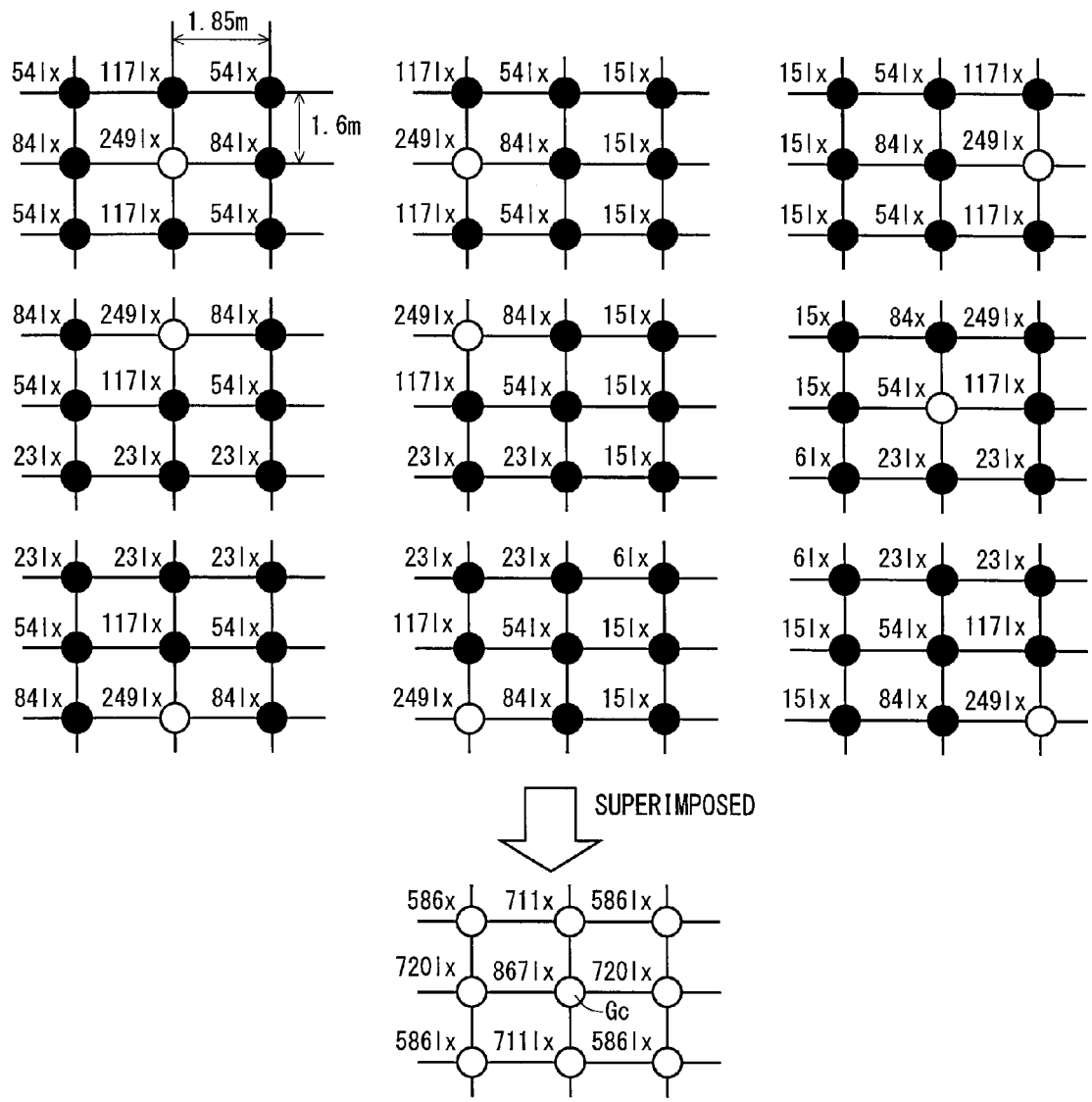

$\alpha = 0.34$
$\beta = 0.47$
$\gamma = 0.22$

F I G . 1 0
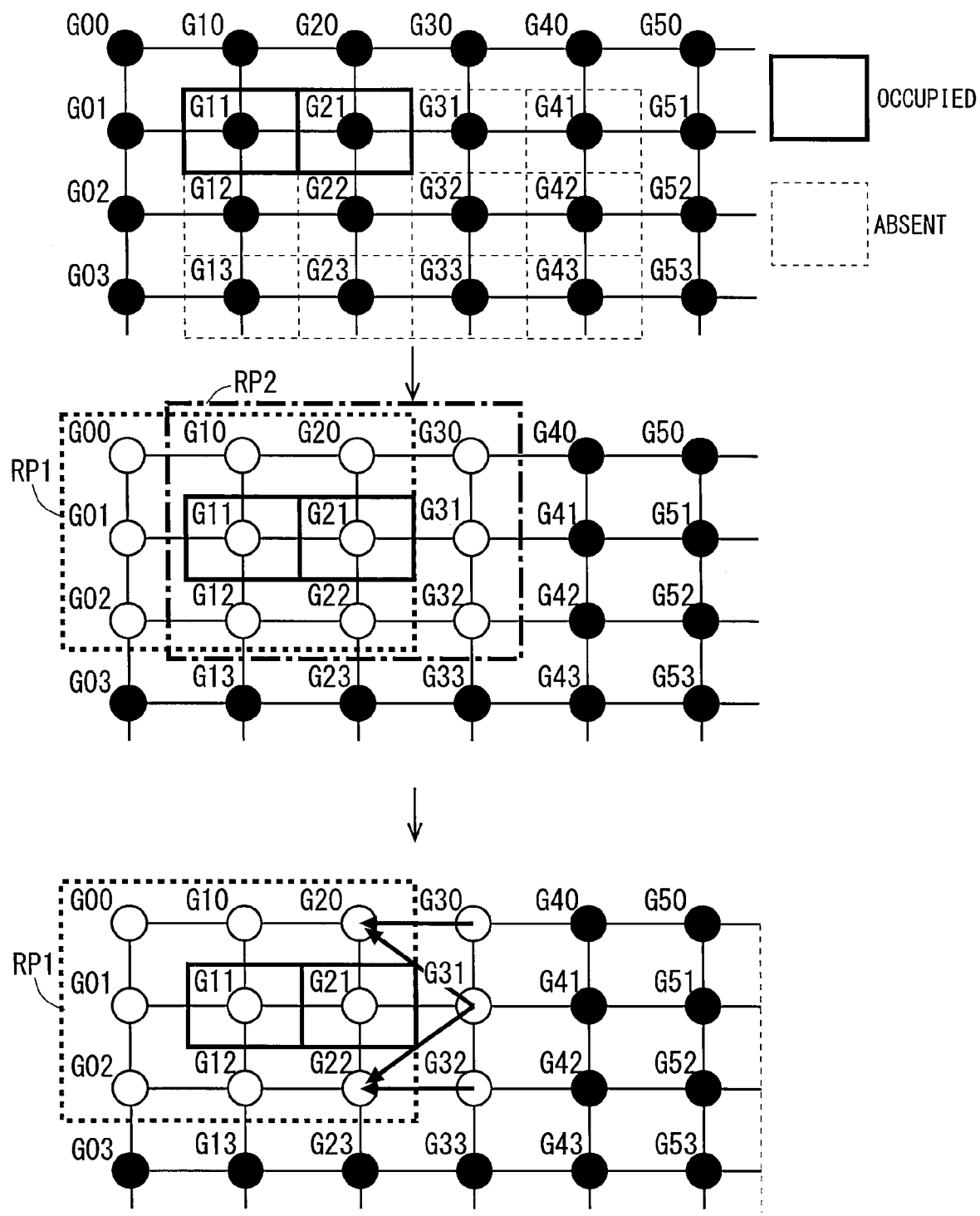

FIG. 12
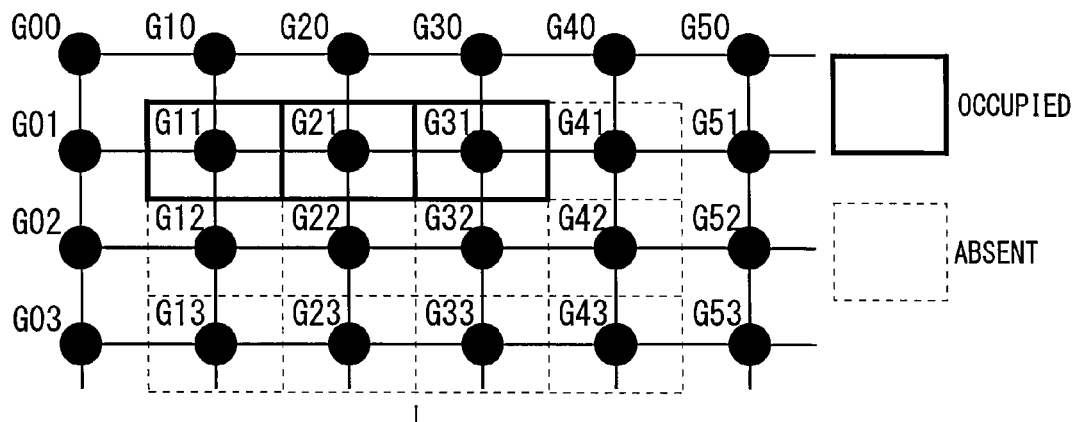
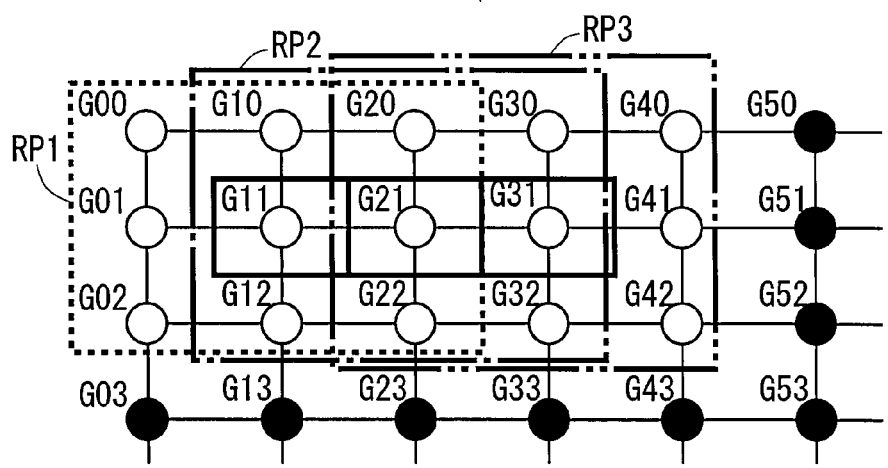
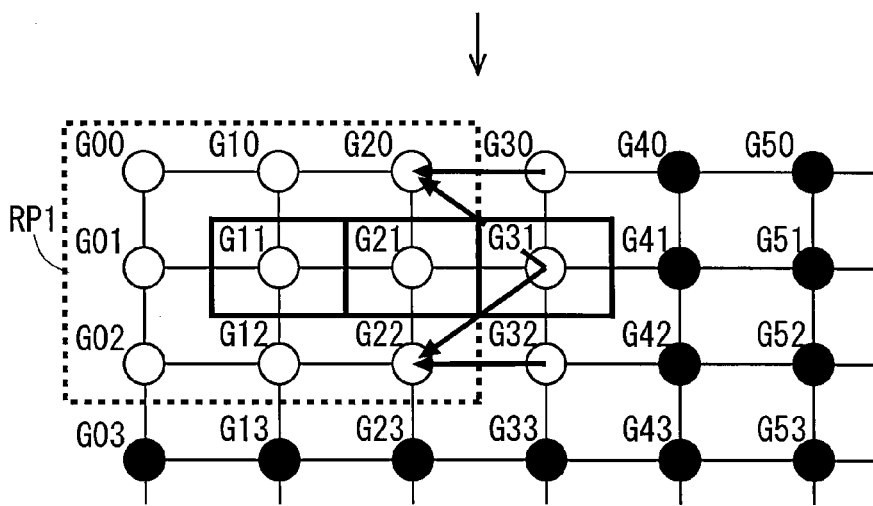

F I G . 1 4
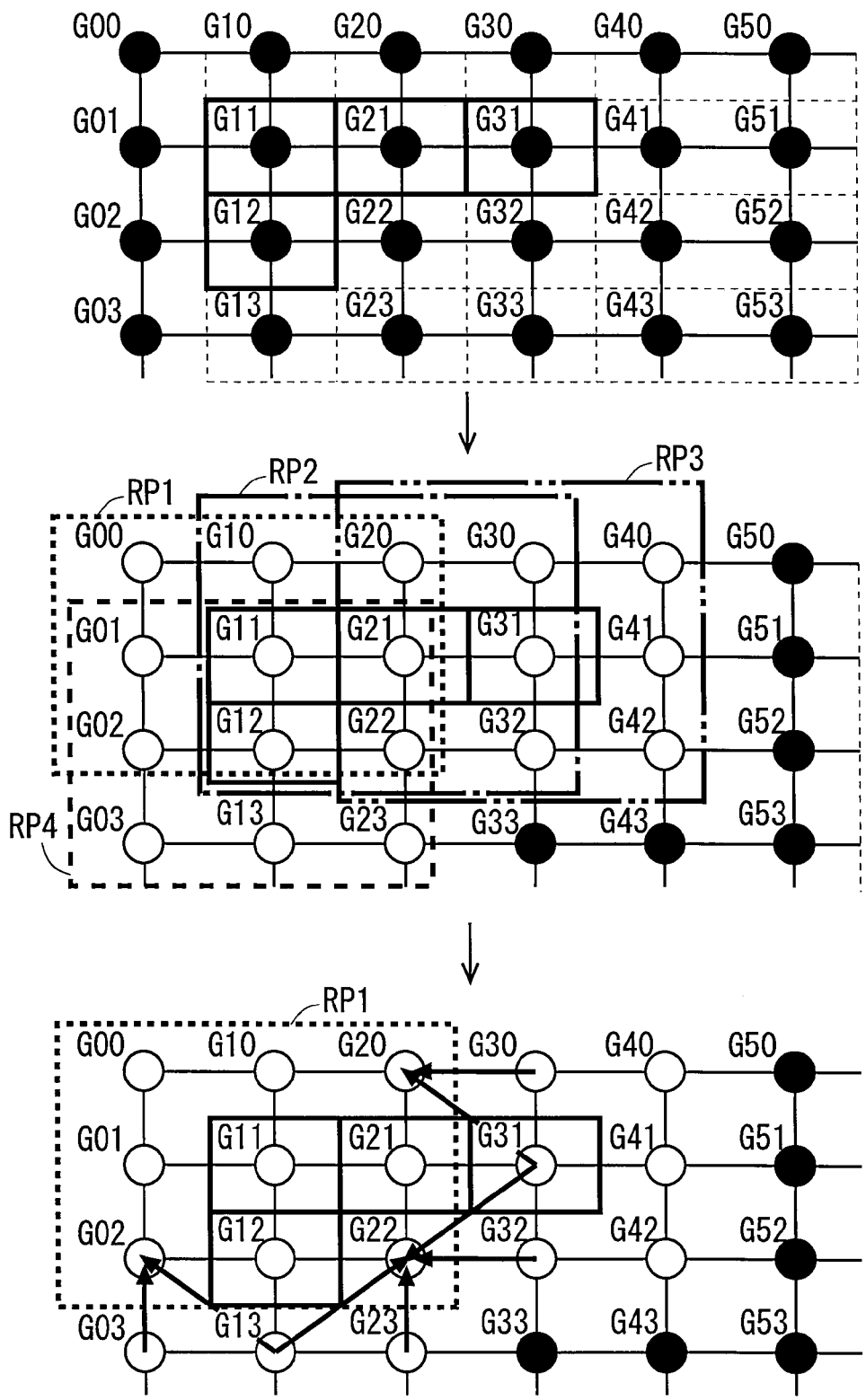

F I G . 1 6
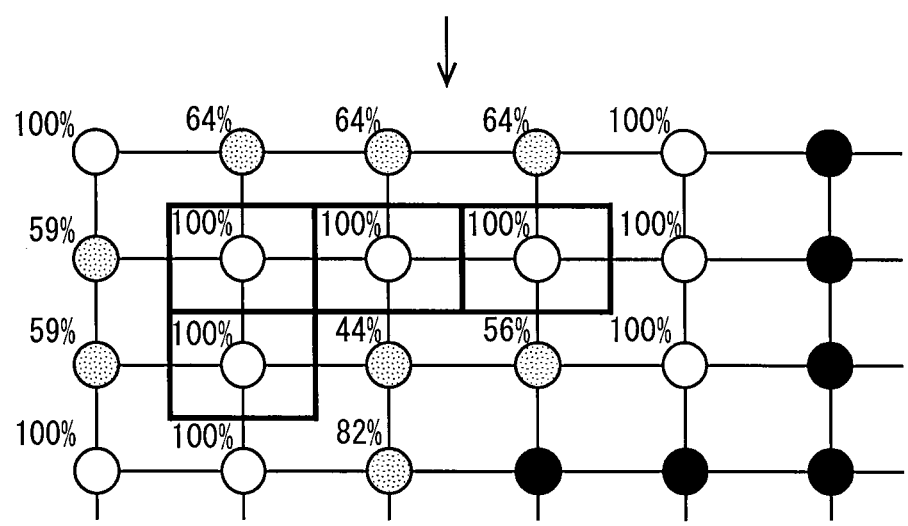

F I G . 1 7
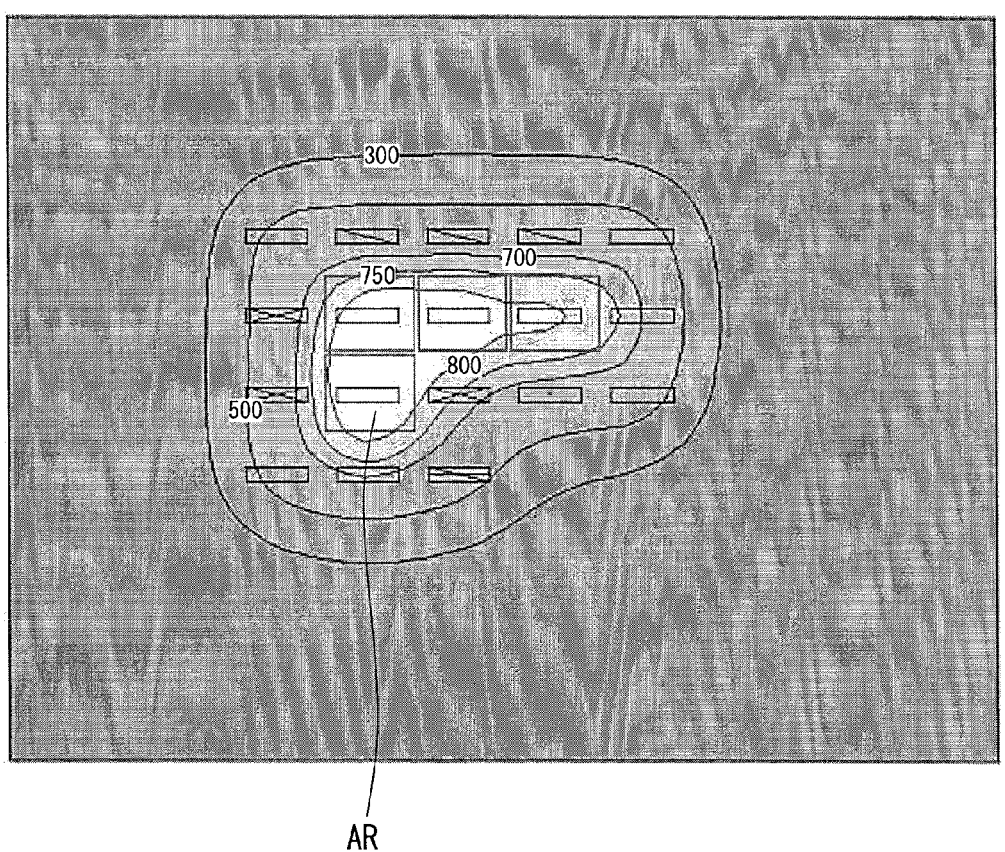
AR

AR

BEFORE SUBTRACTION PROCESS

AFTER SUBTRACTION PROCESS

FIG. 22
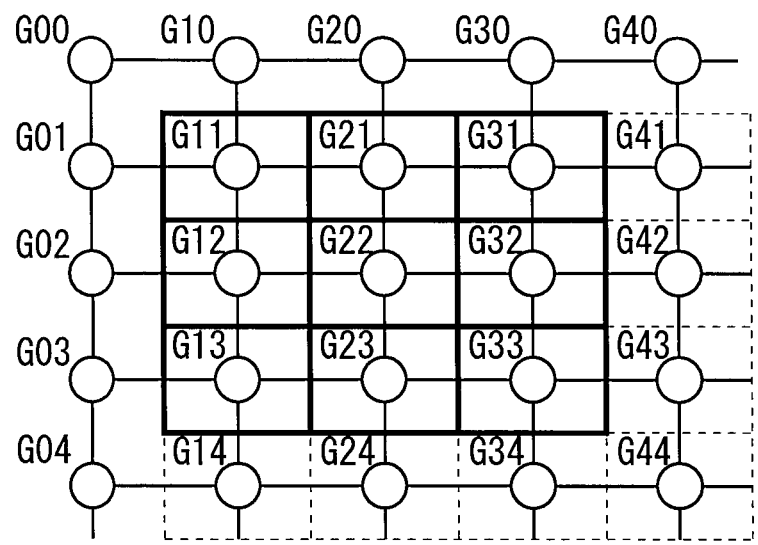
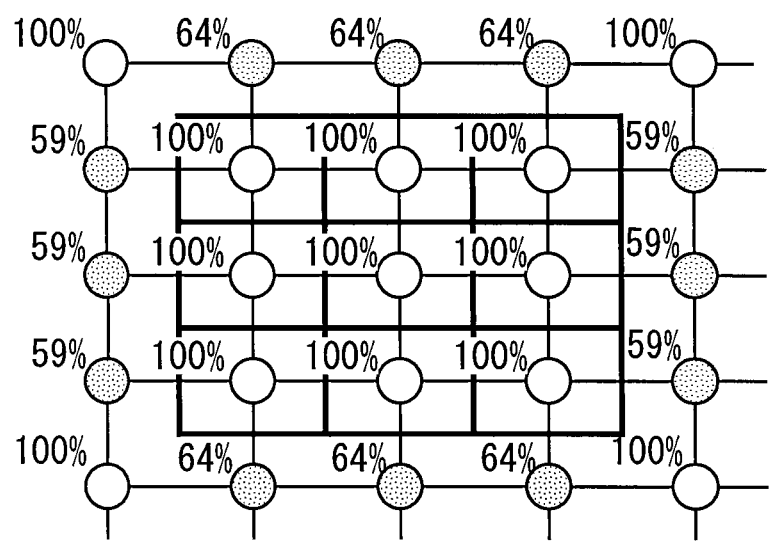

F I G . 2 4
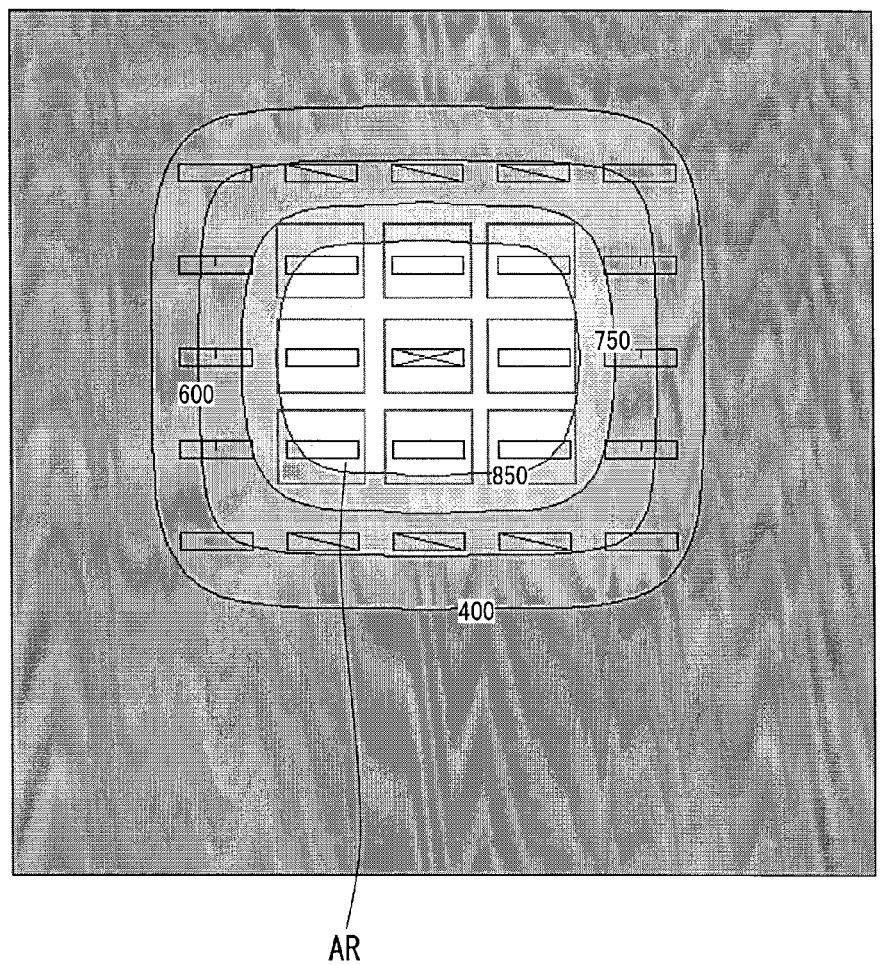

F I G . 2 6
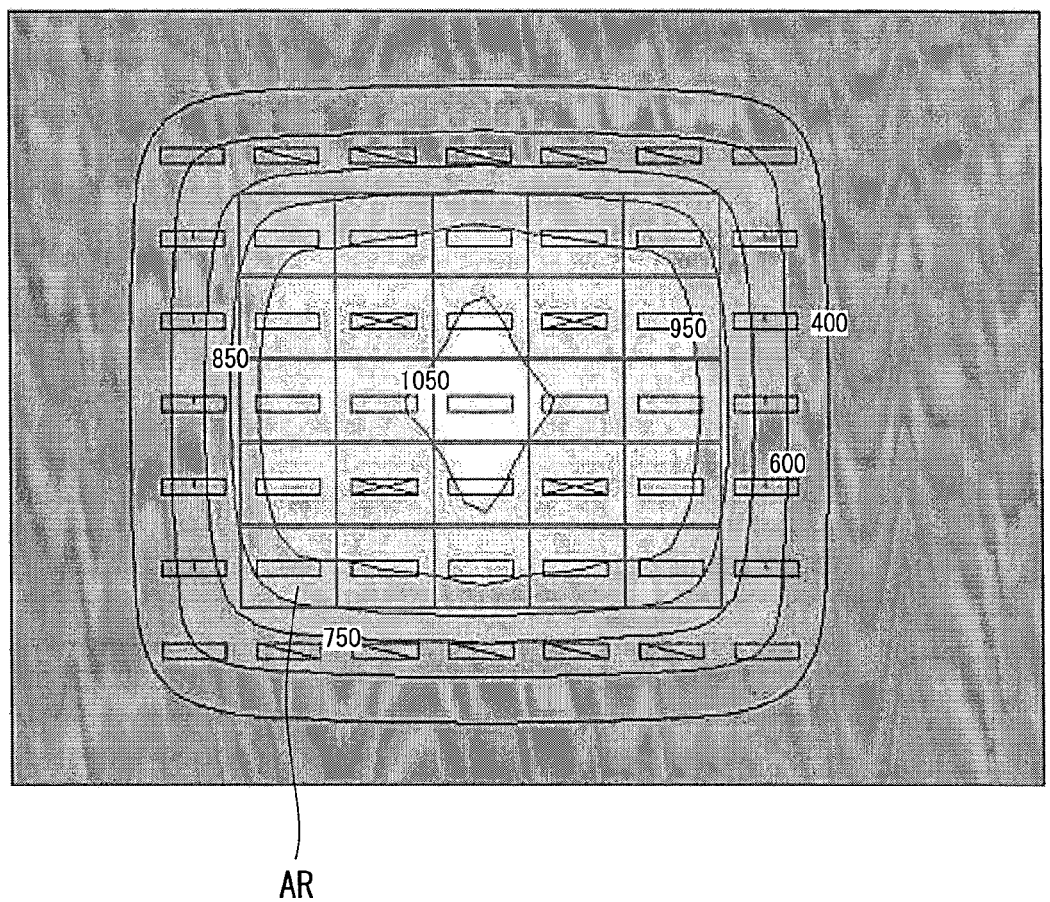

LIGHT CONTROL SYSTEM, LIGHT CONTROL METHOD AND COMPUTER READABLE MEMORY

TECHNICAL FIELD

The present invention relates to a light control technology for lighting equipment.

BACKGROUND ART

In rooms of offices, schools, or the like, a large number of lighting equipment typically having a straight tube shape are arranged at regular intervals in a grid pattern on the ceiling.

In such rooms, in control of the lighting equipment for efficient illumination suitable for occupancy statuses, power cannot be saved satisfactorily by merely turning off the lighting equipment near the seats of absentees.

In rooms of offices or the like, the illuminance necessary for an occupant is obtained not only from the light of one piece of lighting fixture but also from the overlapped light of a plurality of lighting equipment. When turning off a lighting fixture, accordingly, not only its influence on the seat positioned directly below this lighting fixture but also its influence on the adjacent seats is preferably taken into account.

For efficient illumination suitable for occupancy statuses, therefore, the brightness of each of a plurality of lighting equipment is adjusted through the cooperation among the plurality of lighting equipment.

In light control to adjust the brightness of the light, an illuminance sensor is typically used to perform light control based on the illuminance detected by the illuminance sensor (for example, see Patent Document 1).

PRIOR ART DOCUMENT

Patent Document

Patent Document 1: Japanese Patent Application Laid-Open No. 2008-204897

SUMMARY OF THE INVENTION

Problem to be Solved by the Invention

Unfortunately, it is costly to install an illuminance sensor per seat for light control through the cooperation among a plurality of lighting equipment.

The present invention therefore has an object to provide a technology capable of controlling the light of a plurality of lighting equipment without installing an illuminance sensor per seat.

Means to Solve the Problem

A light control system according to a first aspect of the present invention includes: a plurality of lighting devices respectively arranged, on a ceiling surface, at a plurality of grid points of the ceiling surface partitioned in a grid pattern; a sensor that detects occupancy statuses of a plurality of seats located correspondingly to positions of the plurality of grid points; and a controller capable of communicating with each of the plurality of lighting devices. The controller: generates, for each of groups set correspondingly to occupied locations, light control information on a lighting device that becomes a dimming target in each of the groups, where a block formed of a plurality of grid points centering around a grid point of an occupied location is one group, and transmits the light control information. A lighting device being a dimming target among the plurality of lighting devices performs light control based on the received light control information.

In a second aspect of the light control system according to the present invention, in the first aspect, the controller determines, among the plurality of lighting devices, a lighting device at each of grid points included in each of the groups as a to-be-turned-on light, specifies, for each of the groups, a lighting device adjacent to another to-be-turned-on light at a grid point outside of the group as the lighting device being a dimming target among the lighting devices at grid points in each of the groups, and calculates, as the light control information, a light control ratio indicating a ratio of an output of the lighting device being a dimming target specified for each of the groups to a rated output of the lighting device.

In a third aspect of the light control system according to the present invention, in the second aspect, in a case where a reference illuminance represents an illuminance on an illumination surface at a grid point at which a lighting device being a dimming target when the lighting device being a dimming target is turned on alone with a rated output, the controller calculates the light control ratio such that a composite illuminance approaches the reference illuminance, the composite illuminance being obtained by adding an illuminance on the illumination surface provided from the lighting device being a dimming target and an illuminance on the illumination surface provided from the another to-be-turned-on light adjacent to the lighting device being a dimming target.

In a fourth aspect of the light control system according to the present invention, in the third aspect, the controller preliminarily stores, as first illuminance ratios, ratios of an illuminance on an illumination surface at a grid point and an illuminance on an illumination surface at each adjacent grid point adjacent to the grid point, which are obtained when a lighting device at the grid point is turned on alone with a rated output, to the reference illuminance. The controller obtains the composite illuminance using the first illuminance ratios to calculate the light control ratio such that the composite illuminance approaches one being the first illuminance ratios of the reference illuminance.

In a fifth aspect of the light control system according to the present invention, in the third aspect, a block as the group is formed of a grid point at an occupied location and eight grid points adjacent to the grid point. The controller judges whether or not a specific group, which is the group in which seats at the grid points included therein are all occupied, exists, calculates, in a case where the specific group exists, a light control ratio of a lighting device at a center grid point positioned at the center of the specific group as the light control information. The controller obtains a cumulative illuminance being an accumulation of illuminances on an illumination surface at the center grid point, the illuminances being respectively provided from to-be-turned-on lights at grid points that are adjacent to any of grid points in the specific group and are not included in the specific group. The controller calculates, as a light control ratio of the lighting device at the center grid point, a ratio of a value obtained by subtracting the cumulative illuminance from the reference illuminance to the reference illuminance.

In a sixth aspect of the light control system according to the present invention, in the fifth aspect, the controller preliminarily stores, as second illuminance ratios, ratios of an illuminance on an illumination surface at a grid point and an illuminance on an illumination surface at each of grid points that adjacently surround each adjacent grid point adjacent to the grid point, which are obtained when a lighting device at the grid point is turned on alone with a rated output, to the reference illuminance. The controller obtains the cumulative illuminance using the second illuminance ratios to calculate, as a light control ratio of the lighting device at the center grid point, a value obtained by subtracting the cumulative illuminance from one being the second illuminance ratios of the reference illuminance.

A light control method according to the present invention is a method for a plurality of lighting devices respectively arranged, on a ceiling surface, a plurality of grid points of the ceiling surface partitioned in a grid pattern, and the method includes: a) detecting occupancy statuses of a plurality of seats located correspondingly to positions of the plurality of grid points; b) generating, for each of groups set correspondingly to occupied locations, light control information on a lighting device that becomes a dimming target in each of the groups, where a block formed of a plurality of grid points centering around a grid point of an occupied location is one group; and c) performing light control on the lighting device being a dimming target based on the received light control information.

A non-transitory computer-readable memory according to the present invention stores a program that causes a computer built in a controller of a light control system including: a plurality of lighting devices respectively arranged, on a ceiling surface, at a plurality of grid points of the ceiling surface partitioned in a grid pattern; a sensor that detects occupancy statuses of a plurality of seats positioned correspondingly to positions of the plurality of grid points; and the controller capable of communicating with each of the plurality of lighting devices, to perform the steps of: a) determining, when a block formed of a plurality of grid points centering around a grid point at an occupied location is a constitutional unit of one group, a lighting device at each of grid points included in each of groups set correspondingly to occupied locations as a to-be-turned-on light among the plurality of lighting devices; b) specifying, for each of the groups, lighting devices adjacent to another to-be-turned-on light device at a grid point outside of the group as a lighting device that becomes a dimming target among the lighting devices at grid points in each of the groups; and c) calculating a light control ratio indicating a ratio of an output of the lighting device being a dimming target specified for each of the groups to a rated output of the lighting device.

Effects of the Invention

The present invention can perform light control on each lighting fixture without installing an illuminance sensor per seat.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is a view showing the illuminance on a working surface (working surface illuminance) at each grid point in the case where one light source at a grid point is turned on.
FIG. 7 is a view showing the illuminance at each grid point when nine light sources in one group are all turned on.
FIG. 10 is a view showing a first mode of a light control operation.
FIG. 12 is a view showing a second mode of the light control operation.
FIG. 14 is a view showing a third mode of the light control operation.
FIG. 16 is still another view showing the third mode of the light control operation.
FIG. 17 is a view showing the illuminance distribution in the case where a simulation is performed at a light control ratio obtained through the light control operation in the third mode.
FIG. 22 is a view showing a first mode of a light control operation in a light control system according to a second embodiment.
FIG. 24 is a view showing the illuminance distribution in the case where a simulation is performed at a light control ratio obtained through the light control operation in the first mode in the light control system according to the second embodiment.
FIG. 26 is a view showing the illuminance distribution in the case where a simulation is performed at a light control ratio obtained through the light control operation in the second mode in the light control system according to the second embodiment.

DESCRIPTION OF EMBODIMENTS

Embodiments will be described below with reference to the drawings. The elements denoted by the same references in different drawings are the same or like elements.

1. First Embodiment

[1-1. Configuration]

Figure 1:
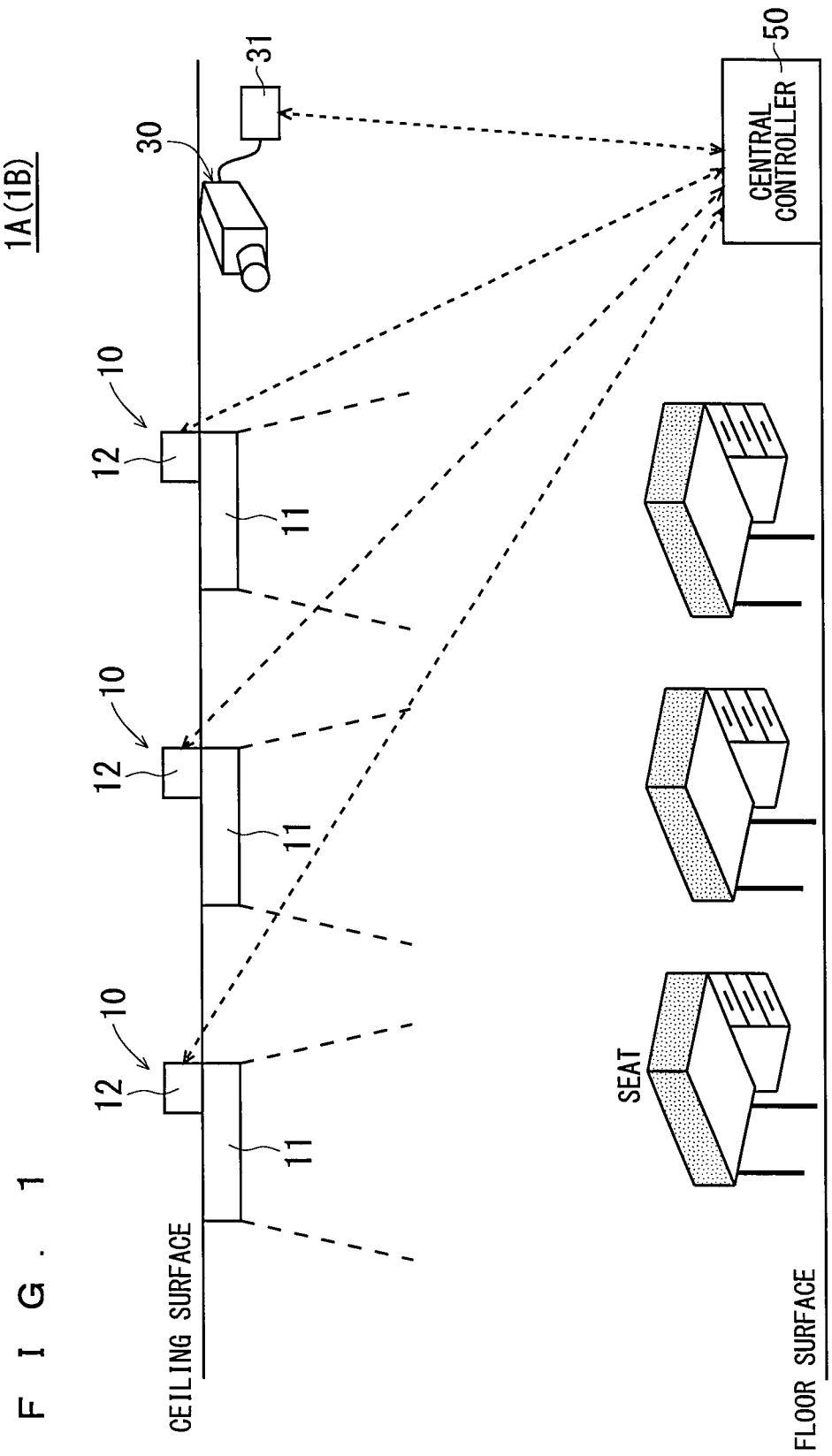
FIG. 1 is a view showing an overall configuration of a light control system according to a first embodiment.

FIG. 1 is a view showing the overall configuration of a light control system 1A according to a first embodiment.

As shown in FIG. 1, the light control system 1A is configured with a plurality of lighting devices 10 provided on the ceiling of, for example, an office, a motion sensor 30, and a central controller 50.

The light control system 1A with the above-mentioned configuration performs a light control operation of detecting an occupancy status of each seat with the motion sensor 30 to perform light control on each of the lighting devices 10 with a central controller 50 based on the detected occupancy status.

Figure 2:
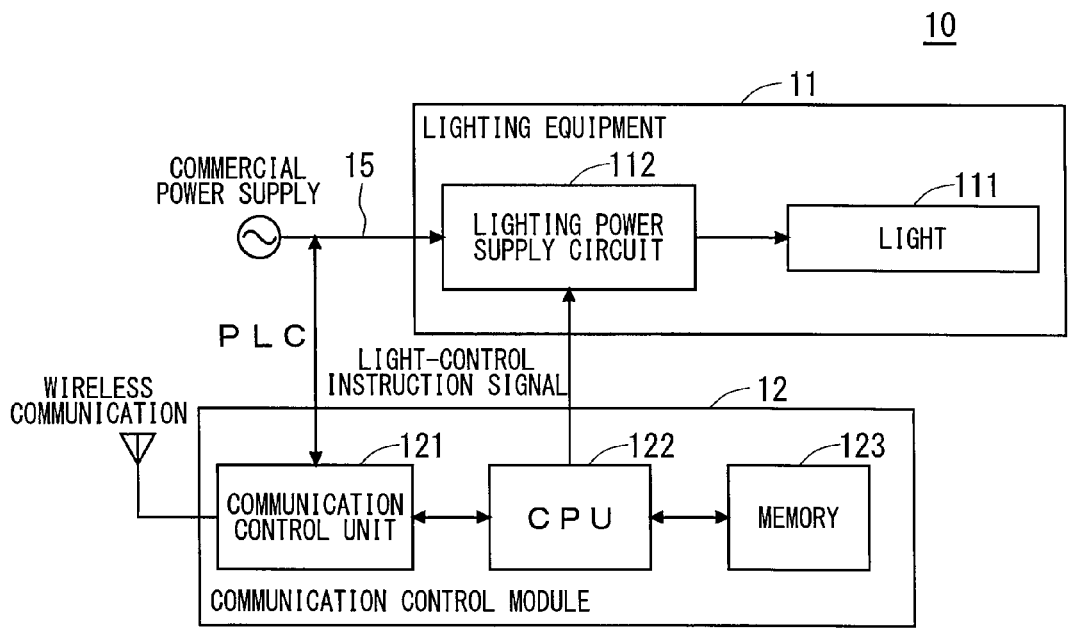
FIG. 2 is a diagram showing a configuration of a lighting device.
Figure 3:
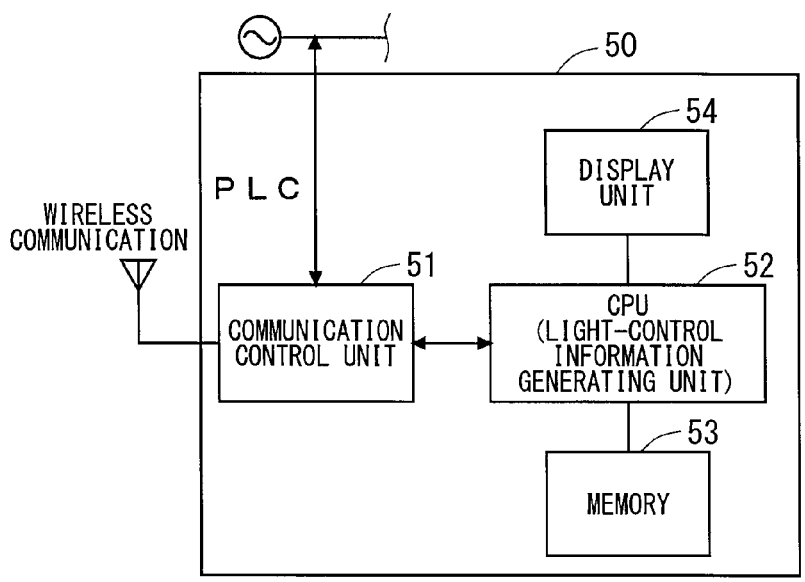
FIG. 3 is a diagram showing a configuration of a central controller.

Each of the components of the light control system 1A will be described below in detail. FIG. 2 is a diagram showing the configuration of the lighting device 10. FIG. 3 is a diagram showing the configuration of the central controller 50.

As shown in FIG. 2, the lighting device 10 is configured with a lighting fixture (also referred to as "lamp fixture" or merely as "light") 11 and a communication control module 12.

The lighting fixture 11 includes a light 111 that emits light and a lighting power supply circuit 112 that supplies the light 111 with power. For example, a Hf (high frequency) fluorescent lamp, an LED lamp, or other lamp is adopted as the light 111. In the case where the Hf fluorescent lamp is adopted as the light 111, a Hf inverter is used as the lighting power supply circuit 112. Meanwhile, in the case where an LED lamp is adopted as the light 111, an LED constant current circuit is used as the lighting power supply circuit 112.

The communication control module 12 includes a communication control unit 121, a CPU 122, and a memory 123, and controls various operations or the like of the lighting device 10.

To be specific, the communication control unit 121 controls the communication operation for communication with an external device such as the central controller 50. The communication with the external device may be performed through at least one of wireless communication and PLC (power line communication) by means of a power line 15. FIG. 2 illustrates a mode in which communication is enabled through wireless communication and power line communication. The communication control unit 121 receives the light control information transmitted from the central controller 50 and then outputs this light control information to the CPU 122.

The CPU 122 reads the program stored in the memory 123 and executes this program, to thereby implement the various functions. For example, the CPU 122 functions as a light-control instruction unit that performs light control on the lighting fixture 11 based on the light control information and outputs an instruction signal for light control (light-control instruction signal) to the lighting fixture 11.

The motion sensor 30 (FIG. 1) is configured with an imaging device such as a camera and has a function as a detection unit that detects an occupancy status of each seat in a room. The motion sensor 30 also includes a communication module 31 and is configured to communicate with the central controller 50. The information on the occupancy status of each seat detected by the motion sensor 30 is transmitted to the central controller 50 via the communication module 31. The motion sensor 30 and the central controller 50 may communicate with each other through wireless communication or wired communication such as power line communication.

The central controller 50 is configured to communicate with each of the lighting devices 10 and the motion sensor 30 and generates the light control information for controlling the light of each lighting device 10 based on the occupancy status detected by the motion sensor 30.

More specifically, as shown in FIG. 3, the central controller 50 includes a communication control unit 51, a CPU 52, a memory 53, and a display unit 54.

The communication control unit 51 controls the communication operation for communication with an external device such as the lighting device 10 or the motion sensor 30. The communication control unit 51 communicates with the external device through at least one of wireless communication and power line communication.

The CPU 52 reads the program stored in the memory 53 and executes this program, to thereby function as, for example, a light-control information generating unit. The light-control information generating unit generates the light control information on each lighting device 10 based on an occupancy status and transmits this light control information to the outside via the communication control unit 51.

[1-2. Outline of Light Control Technique]

Figure 4:
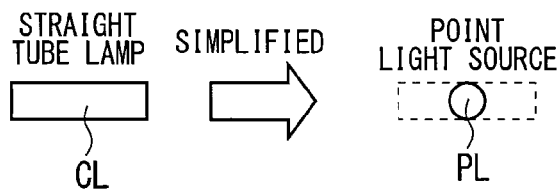
FIG. 4 is a schematic diagram showing a straight tube light as a point light source.
Figure 5:
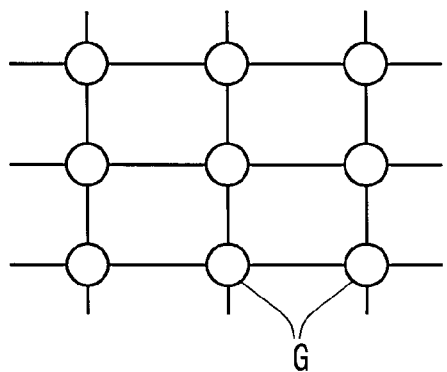
FIG. 5 is a view showing a state in which point light sources in an office are arranged at grid points of a grid.

The following rules (1) to (5) are applied in light control for the light in an office. FIG. 4 is a schematic diagram showing that the straight tube light is shown as a point light source. FIG. 5 is a view showing the state in which the point light sources in an office are respectively arranged at grid points of a grid.

(1) As shown in FIG. 4, the straight tube light CL is treated as a point light source PL.

(2) As shown in FIG. 5, the point light sources PL on the ceiling of the office are respectively arranged at grid points G of a grid. In this embodiment, the point light source PL is positioned at each grid point G and a working surface (illumination surface) is positioned directly below the point light source PL. In the drawings below, the point light source PL is turned on at the grid point G indicated by an open circle, and the point light source PL is turned off at the grid point G indicated by a solid circle.

(3) Light control is performed, with a group formed of nine light sources as a base control unit.

An optimum illuminance (in accordance with the recommended level of illuminance by JIS, 750 lx (750 lux)) suitable for work cannot be obtained by one straight tube light. Thus, to obtain the optimum illuminance on a working surface, the light directly above the working surface as well as a plurality of adjacent lights are turned on.

Figure 6:
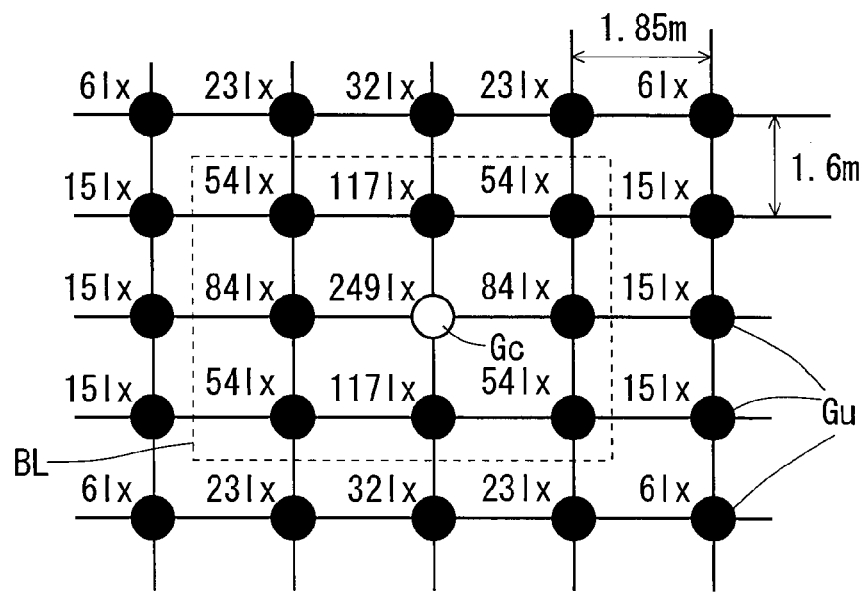

FIG. 6 is a view showing the illuminance on the working surface (working surface illuminance) at each grid point in the case where one light source at a grid point Gc is turned on. As shown in FIG. 6, an illuminance of 249 lx is obtained on the working surface directly below the light source turned on at the grid point Gc, but the illuminance decreases inversely with the square of distance as the distance from the light source increases.

On the working surfaces of grid points Gu, which are positioned with one gird point sandwiched between themselves and the grid point Gc where the turned-on light source is positioned, illuminance decreases considerably. In this embodiment, accordingly, in the calculation of the illuminance on the working surface at a grid point as a grid point of interest, the effects of the light sources at the grid points, which are positioned with one grid point sandwiched between the grid point of interest and themselves, are not taken into account. In other words, in the calculation of the illuminance on the working surface at a grid point of interest, the illuminance from light sources at grid points (adjacent grid points)

adjacent to the grid point of interest is taken into account, but the effects of light sources at other grid points positioned farther from the adjacent grid point are not taken into account. In this embodiment, additionally, the light of the light sources in a group is controlled, with one group formed of nine light sources, surrounded by a dotted line BL, as a base control unit.

In the following description, the "illuminance on the working surface at the grid point" is simply abbreviated as the "illuminance at the grid point." The illuminances shown in FIG. 6 show the illuminances on the working surfaces at a height of 0.7 m from the floor surface when the model FHX61350A lights (manufactured by Panasonic Corporation), installed on the ceiling that is 2.7 m high, are turned on, which are values calculated by the point-by-point method. The illuminance on each working surface is calculated by taking into account the data regarding in which direction of the space and at what intensity the light from the light source is being emitted. This data is disclosed as a light distribution curve by the lighting manufacturer. The illuminance on each working surface may be obtained through actual measurement with an illuminance meter on each working surface, in place of being calculated through computation by the point-by-point method.

FIG. 7 shows the illuminance at each grid point when nine light sources in one group are all turned on. As shown in FIG. 7, the illuminance at each grid point is obtained by superimposing illuminances on one another when the light sources in the group are each turned on. It is shown that when all the light sources are turned on, an illuminance of 750 lx or more is obtained at the center grid point Gc in the group.

Figure 8:
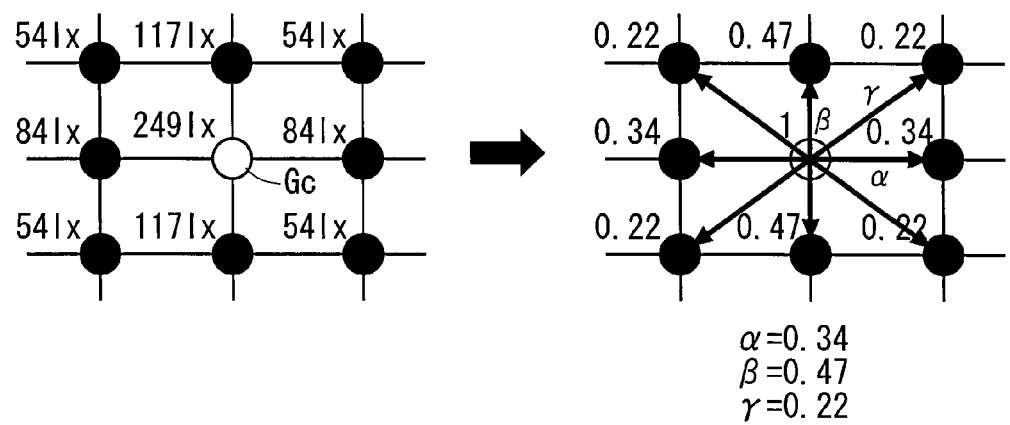
FIG. 8 is a view showing an illuminance ratio at each grid point.

(4) An illuminance ratio is calculated. FIG. 8 is a view showing an illuminance ratio at each grid point.

In the calculation of an illuminance ratio, a reference illuminance is the working surface illuminance at a center grid point of a group when the light source at the center grid point is turned on alone with a rated output. Then, the working surface illuminances at adjacent grid points adjacent to the center grid point are converted into illuminance ratios to the reference illuminance.

To be specific, as shown in FIG. 8, with the assumption that the illuminance "249" lx at the center grid point Gc is "1", the illuminances at the adjacent grid points are calculated. The illuminance at the adjacent grid point is the illuminance ratio at the adjacent grid point to the illuminance at the center grid point Gc. From this illuminance ratio, the attenuation factor of the light quantity between the center grid point Gc and the adjacent grid point can be obtained. In other words, a horizontal light quantity attenuation factor $\alpha$ is 0.34, a vertical light quantity attenuation factor $\beta$ is 0.47, and a diagonal light quantity attenuation factor $\gamma$ is 0.22.

The thus obtained illuminance ratios (first illuminance ratios) at the adjacent grid points to the reference illuminance are preliminarily held in a storage (for example, memory 53) of the central controller 50. The preliminarily held illuminance ratios are used in each computation using the illuminances at grid points described below, which is performed by the light-control information generating unit. As described above, the illuminances at grid points are represented as the illuminance ratios to the reference illuminance, and a computation is performed using these illuminance ratios. This simplifies the computation, reducing a computation amount.

(5) A light control ratio is calculated by an averaging process.

Figure 9:
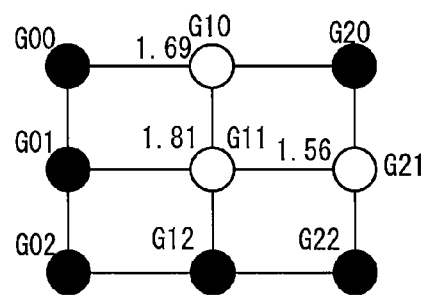
FIG. 9 is a view showing an outline of an averaging process.

The averaging process is used in the case where a light control ratio of the light source being a light-control target is calculated in consideration of an extra illuminance to be provided from the adjacent light sources adjacent to the light source being a light-control target. FIG. 9 is a view showing the outline of the averaging process.

With reference to FIG. 9, the respective light sources at grid points G10, G11, and G21 are to-be-turned-on light sources. The respective illuminances at the grid points G10, G11, and G21 are represented using the illumination ratios of FIG. 8.

The illuminances from the light sources at the grid points G11 and G21 are added to the illuminance at the grid point G10, so that an illuminance (composite grid point illuminance) L'(G10) at the grid point G10 is L'(G10)=1+0.47+0.22=1.69.

Similarly, the illuminances from the light sources at the grid points G10 and G21 are added to the illuminance at the grid point G11, so that a composite grid point illuminance L'(G11) at the grid point G11 is L'(G11)=1+0.47+0.34=1.81.

The illuminances from the light sources at the grid points G10 and G11 are added to the illuminance at the grid point G21, so that a composite grid point illuminance L'(G21) at the grid point G21 is L'(G21)=1+0.34+0.22=1.56.

Then, the illuminance (also referred to as "single grid point illuminance" or "reference illuminance") "1" at the grid point when the light source at this grid point is turned on alone is divided by each composite grid point illuminance, to thereby calculate a light control ratio of each light source.

To be specific, the light control ratio at the grid point G10 is 1/L'(G10)=0.59, the light control ratio at the grid point G11 is 1/L'(G11)=0.55, and the light control ratio at the grid point G21 is 1/L'(G21)=0.64.

Herein, the light control ratio means the ratio to the rated output of the lighting device 10 as a light source. Alternatively, the light control ratio may be defined as the proportion of a light output when all the lighting devices 10 are turned on, which is represented as a ratio.

A composite grid point illuminance at each of the grid points G10, G11, and G21 in the case where the light sources are turned on at the obtained light control ratios is recalculated, so that the composite grid point illuminance at the grid point G10 is 0.59*1+0.55*0.47+0.64*0.22=0.99. The composite grid point illuminance at the grid point G11 is 0.55*1+0.59*0.47+0.64*0.34=1.04, and the composite grid point illuminance at the grid point G21 is 0.64*1+0.59*0.22+0.55*0.34=0.96.

The averaging process of averaging the illuminances of the to-be-turned-on light sources is performed in consideration of the illuminances provided by the adjacent light sources as described above, allowing the illuminance ratio at the grid point of the to-be-turned-on light source to come close to "1" being the reference illuminance.

The averaging process can be also represented as the process of calculating a light control ratio of a light source being a light-control target so as to allow a composite grid point illuminance at the grid point being a light-control target, which is obtained by addition of an illuminance provided by a light source being a light-control target and illuminances provided by adjacent light sources adjacent to the light source being a light-control target, to come close to the reference illuminance.

Among the light sources provided in rooms of offices, schools, or the like, the distance between the adjacent light sources is short, and thus, the light quantity provided to each other between the light sources is large. Under such a condition, the averaging process of averaging the illuminances of light sources is particularly effective, in which the illuminances to be provided by adjacent light sources are taken into account.

[1-3. Light Control Operation]

Figure 11:
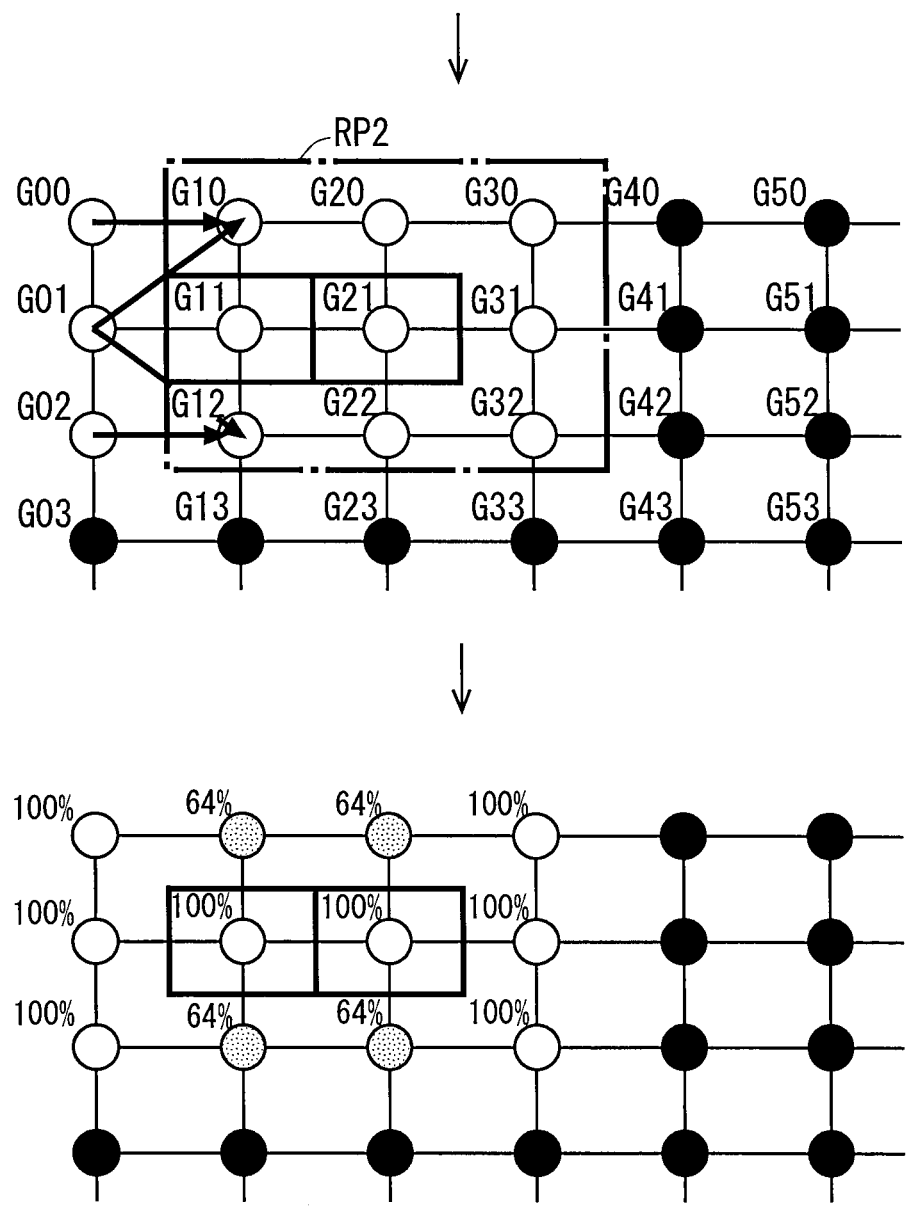
FIG. 11 is another view showing the first mode of the light control operation.

Next, the light control operation in the light control system 1A will be described. FIGS. 10 and 11 are views showing a first mode of the light control operation.

As shown in FIG. 10, in the light control operation, occupied locations in the office are first specified with the motion sensor 30. In the example of FIG. 10, the occupied locations are grid points G11 and G21.

Then, the light-control information generating unit of the central controller 50 determines to-be-turned-on light sources (to-be-turned-on lights) to be turned on among the light sources in the office. The to-be-turned-on light sources are determined based on the occupied locations. The light sources positioned at the grid points of the occupied locations and eight adjacent light sources adjacent to each of the light sources are determined as to-be-turned-on light sources. With reference to FIG. 10, the occupied locations are two adjacent locations, and the to-be-turned-on light sources are 12 light sources positioned at grid points G00, G10, G20, G30, G01, G11, G21, G31, G02, G12, G22, and G32. As described above, for each occupied location, the light-control information generating unit also has the function as the determining unit that determines, as to-be-turned-on light sources, the light sources respectively positioned at grid points included in the group to be set depending on the occupied location.

Then, the light-control information generating unit generates the light control information on to-be-turned-on light sources. In the case where the center light source is the light source positioned at the grid point of an occupied location, the light control information on to-be-turned-on light sources is generated in for every unit being a group including the center light source and eight adjacent light sources adjacent to the center light source. In the example of FIG. 10, thus, the light control information is generated for each of a group RP1 centering around the light positioned at the grid point G11 and a group RP2 centering around the light positioned at the grid point G21.

When light control for one group is finished, the generation of the light control information on to-be-turned-on light sources is sequentially shifted to the next group. Adopted as the shifting order is a so-called raster order in which shifting is performed rightward in order from an upper-left grid point to a lower-right grid point while beginning a new line every time shifting at the former line is complete. This means that in the example of FIG. 10, the light control information on the group RP1 is first generated, and then, the light control information on the group RP2 is generated.

In the generation of light control information for every group, the light sources that will become dimming targets (light-control targets) are specified among the light sources in a group being a light-control target. In this embodiment, the light source being a dimming target in a group is a light source adjacent to the to-be-turned-on light sources outside of the group. The light source positioned at the grid point of an occupied location is excluded from the dimming targets.

Specifically, as shown in FIG. 10, the light sources being dimming targets in the group RP1 are the light source at the grid point G20 adjacent to the grid points G30 and G31 positioned outside of the group and the light source at the grid point G22 adjacent to the grid points G31 and G32 outside of the group. As described above, the light-control information generating unit also has a function as a specifying unit that specifies, among the light sources in a group, the light source adjacent to the to-be-turned-on light sources outside of the group as the light source being a dimming target.

Then, the light-control information generating unit performs the process of calculating the light control ratio of the light source at the grid point G20, which will become a dimming target.

To be specific, an illuminance at a grid point (composite grid point illuminance), which is a dimming target when illuminances from other light sources at the grid points outside of the group are factored in, is calculated. Specifically, in the case where L(Gxy) represents an illuminance (single grid point illuminance) at a grid point when the light source at this grid point is turned on alone with a rated output and L'(Gxy) represents a composite grid point illuminance at a grid point being a dimming target, a composite grid point illuminance L'(G20) at the grid point G20 is indicated as Expression (1).

[Exp. 1]

$$L'(G20)=L(G20)+\alpha L(G30)+\gamma L(31) \quad (1)$$

In Expression (1), $\alpha$ and $\gamma$ represent a light quantity attenuation factor ($\alpha$=0.34) between horizontal grid points and a light quantity attenuation factor ($\gamma$=0.22) between diagonal grid points, respectively, and L'(G20)=1+0.34*1+0.22*1=1.56.

Then, the computation of Expression (2) is performed, in which the single grid point illuminance L(G20) at the grid point G20 being a dimming target is divided by the composite grid point illuminance L'(G20) at the grid point G20, so that a light control ratio R(G20) at the grid point G20 being a dimming target is calculated. In other words, R(G20)=L(G20)/L'(G20)=1/1.56=0.64, and the light control ratio R(G20) is 0.64.

[Exp. 2]

$$R(G20)=L(G20)/L'(G20) \quad (2)$$

In the process of calculating a light control ratio of the light source at the grid point G22, the computation of Expression (3) is performed as in the case of the grid point G20, so that a composite grid point illuminance L'(G22) at the grid point G22 is calculated.

[Exp. 3]

$$L'(G22)=L(G22)+\alpha L(G32)+\gamma L(G31) \quad (3)$$

Then, the computation of Expression (4) is performed, so that a light control ratio R(G22) at the grid point G22 being a dimming target is calculated. In other words, R(G22)=L(G22)/L'(G22)=1/1.56=0.64, and the light control ratio R(G22) is 0.64.

[Exp. 4]

$$R(G22)=L(G22)/L'(G22) \quad (4)$$

As described above, the light-control information generating unit also has a function as a light-control processing section (first light-control processing section) that calculates a light control ratio of each light source that will become a dimming target as the light control information.

Next, the group being a light-control target is changed to the group RP2, and the light control information on the group RP2 is generated.

To be specific, light sources that will become dimming targets are specified among the light sources in the group RP2. The light source being a dimming target in the group is a light source adjacent to to-be-turned-on light sources outside of the group, which is the light source positioned at a grid point at which illuminance is obtained from the light source outside of the group. The light source positioned at the grid point of an occupied location is excluded from the dimming targets.

As shown in FIG. 11, the light sources being dimming targets in the group RP2 are a light source at the grid point G10 adjacent to grid points G00 and G01 outside of the group and a light source at the grid point G12 adjacent to grid points G01 and G02 outside of the group.

Then, the light control process is performed for the light sources at the grid points G10 and G12 that will become dimming targets.

In the process of calculating a light control ratio of the light source at the grid point G10, the computation of Expression (5) is performed as in the cases of the grid points G20 and 22, so that a composite grid point illuminance L'(G10) at the grid point G10 is calculated.

[Exp. 5]

$$L'(G10)=L(G10)+\alpha L(G00)+\gamma L(G01) \quad (5)$$

Then, the computation of Expression (6) is performed, so that a light control ratio R(G10) at the grid point G10 being a dimming target is calculated. In other words, R(G10)=L(G10)/L'(G10)=1/1.56=0.64, and the light control ratio R(G10) is 0.64.

[Exp. 6]

$$R(G10)=L(G10)/L'(G10) \quad (6)$$

In the process of calculating a light control ratio for the light source at the grid point G12, the computation of Expression (7) is performed as in the cases of the grid points G20 and 22, so that a composite grid point illuminance L'(G12) at the grid point G12 is calculated.

[Exp. 7]

$$L'(G12)=L(G12)+\alpha L(G02)+\gamma L(G01) \quad (7)$$

Then, the computation of Expression (8) is performed, so that a light control ratio R(G12) at the grid point G12 being a dimming target is calculated. In other words, R(G12)=L(G12)/L'(G12)=1/1.56=0.64, and the light control ratio R(G12) is 0.64.

[Exp. 8]

$$R(G12)=L(G12)/L'(G12) \quad (8)$$

After the generation of the light control information on the group RP2 is complete, the communication control unit 51 transmits, to each lighting device 10, the light control information on the light source that has become a dimming target. Then, each lighting device 10 performs light control on the light based on the light control information. As a result of the above-mentioned light control operation, as shown in FIG. 11, the to-be-turned-on light sources at the grid points G10, G12, G20, and G22 are each turned on at a light control ratio 0.64 (64%). In other words, the to-be-turned-on light sources at the grid points G00, G01, G02, G11, G21, G30, G31, and G32 are turned on with a rated output, and the to-be-turned-on light sources at the grid points G10, G12, G20, and G22 are turned on with an output 0.64 times the rated output.

Figure 13:
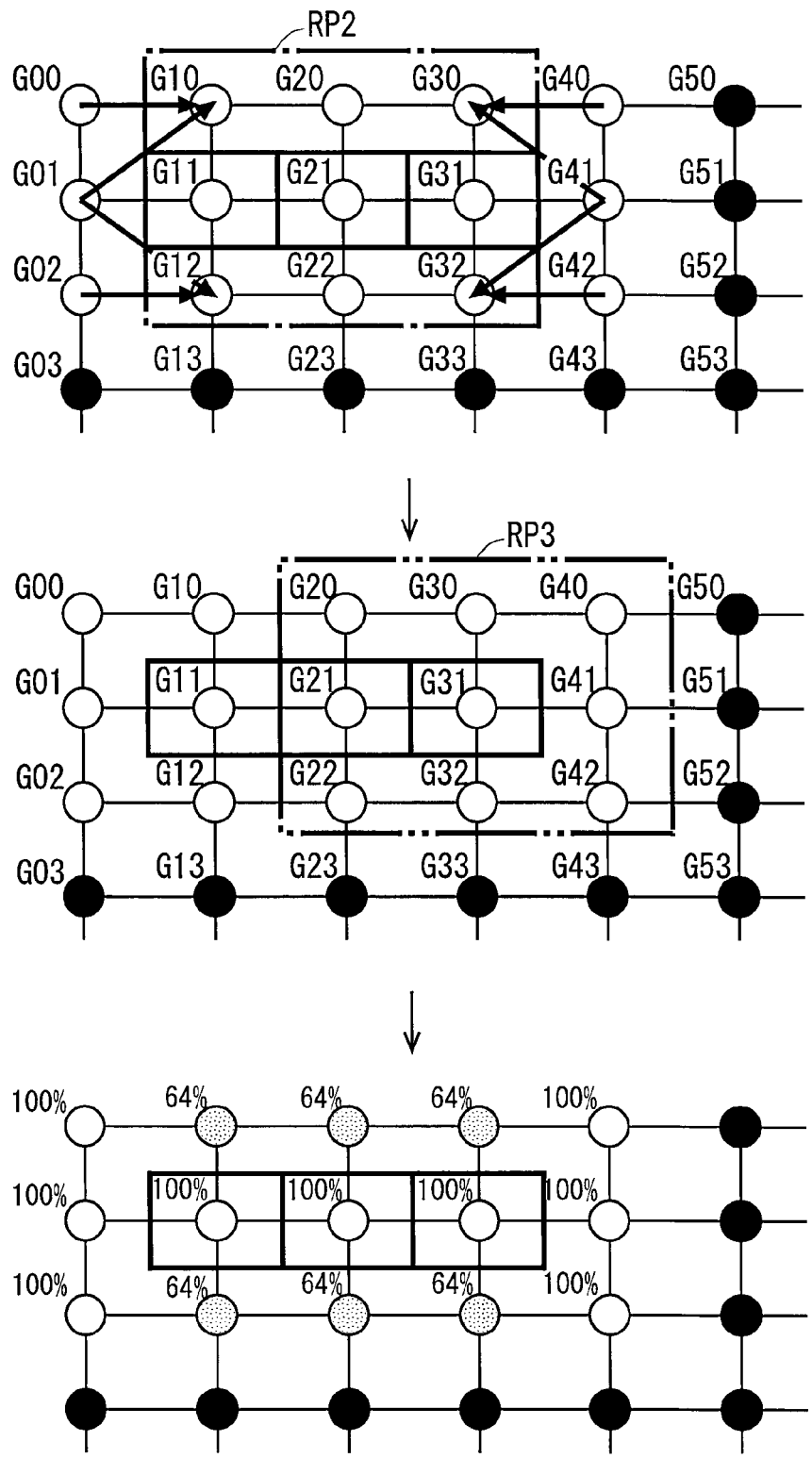
FIG. 13 is another view showing the second mode of the light control operation.

Next, a second mode of the light control operation in the light control system 1A will be described. FIGS. 12 and 13 are views showing the second mode of the light control operation.

In the example of FIG. 12, the occupied locations are grid points G11, G21, and G31, and differently from the first mode, the grid point G31 is the occupied location as well.

Then, the to-be-turned-on light sources are determined among the light sources in the office. The to-be-turned-on light sources are determined based on the occupied locations, so that the light sources positioned at the grid points of the occupied locations and eight adjacent light sources adjacent to each of the above-mentioned light sources are determined as to-be-turned-on light sources. With reference to FIG. 12, the occupied locations are three adjacent locations, and accordingly, the to-be-turned-on light sources are 15 light sources positioned at the grid points G00, G10, G20, G30, G40, G01, G11, G21, G31, G41, G02, G12, G22, G32, and G42.

Then, the light control information on the to-be-turned-on light sources is generated. In the case where the light source positioned at the grid point of the occupied location is a center light source, the light control information on the to-be-turned-on light sources is generated per group including the center light source and eight adjacent light sources adjacent to the center light source. In the example of FIG. 12, the light control information is generated for a group RP1 centering around the light positioned at the grid point G11, a group RP2 centering around the light source positioned at the grid point G21, and a group RP3 centering around the light source positioned at the grid point G31, in the stated order.

In the generation of the light control information on the group RP1, as in the first mode, the light source at the grid point G20 and the light source at the grid point G22 are light sources being dimming targets. Then, calculations are performed as in the first mode, so that a light control ratio R(G20) of the light source at the grid point G20 and a light control ratio R(G22) of the light source at the grid point G22 are each calculated to be 0.64.

Then, in the generation of the light control information on the group RP2, besides the light sources at the grid points G10 and G12, the light sources at the grid points G30 and G32 are light sources being dimming targets.

In the process of calculating light control ratios of the light sources at the grid points G10 and G12, calculations are performed as in the first mode, so that a light control ratio R(G10) of the light source at the grid point G10 and a light control ratio R(G12) of the light source at the grid point G12 are each calculated to be 0.64. In the process of calculating light control ratios of the light sources at the grid points G30 and 32, calculations are performed as in the case in which the light control ratios of the light sources at the grid points G20 and G22 are calculated, so that a light control ratio R(G30) of the light source at the grid point G30 and a light control ratio R(G32) of the light source at the grid point G32 are each calculated to be 0.64.

Then, in the generation of the light control information on the group RP3, the light source at the grid point G20 and the light source at the grid point G22 are light sources being dimming targets. In this case, the light control ratios of the light sources at the grid points G20 and G22 have been calculated for the group RP1, and accordingly, the light control ratios will not be calculated again in the generation of the light control information on the group RP3. As described above, the process of calculating a light control ratio is performed only once for one light source.

As a result of the light control operation in the second mode described above, as shown in FIG. 13, the to-be-turned-on light sources at the grid points G10, G12, G20, G22, G30, and G32 are each turned on at a light control ratio 0.64. In other words, the to-be-turned-on light sources at the grid points G00, G01, G02, G11, G21, G31, G40, G41, and G42 are each turned on with a rated output, and the to-be-turned-on light sources at the grid points G10, G12, G20, G22, G30, and G32 are each turned on with an output 0.64 times the rated output.

Figure 15:
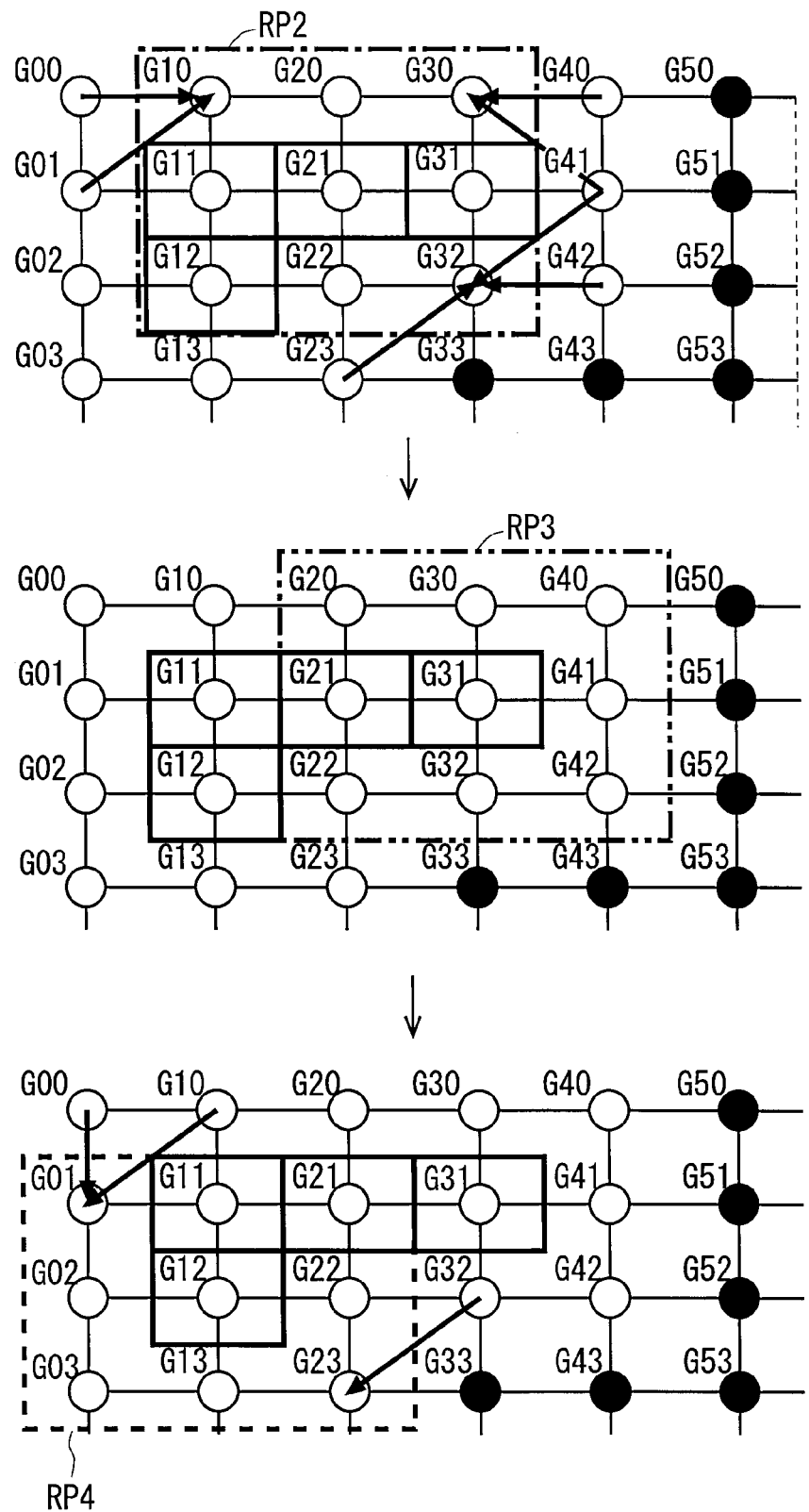
FIG. 15 is another view showing the third mode of the light control operation.

Next, a third mode of the light control operation in the light control system 1A will be described. FIGS. 14, 15, and 16 are views showing the third mode of the light control operation. FIG. 17 is a view showing the illuminance distribution in the case where a simulation is performed at the light control ratio obtained through the light control operation in the third mode.

In the example of FIG. 14, the occupied locations are grid points G11, G21, G31, and G12, and differently from the second mode, the grid point G12 is the occupied location as well.

With reference to FIG. 14, the to-be-turned-on light sources are 18 light sources positioned at grid points G00, G10, G20, G30, G40, G01, G11, G21, G31, G41, G02, G12, G22, G32, G42, G03, G13, and G23.

Then, the light control information on each to-be-turned-on light source is generated per group. In the example of FIG. 14, the light control information is generated for a group RP1 centering around the light positioned at the grid point G11, a group RP2 centering around the light source positioned at the grid point G21, a group RP3 centering around the light source positioned at the grid point G31, and a group RP4 centering around the light source positioned at the grid point G12, in the stated order.

In the generation of the light control information on the group RP1, besides the light sources at the grid points G20 and G22, the light source at the grid point G02 is a light source being a dimming target.

In the process of calculating a light control ratio of the light source at the grid point G20, a calculation is performed as in the first mode, so that the light control ratio R(G20) of the light source at the grid point G20 is calculated to be 0.64.

In the process of calculating a light control ratio of the light source at the grid point G22, the computation of Expression (9) is performed, so that a composite grid point illuminance L'(G22) at the grid point G22 is calculated.

[Exp. 9]

$$L'(G22)=L(G22)+\alpha L(G32)+\beta L(G23)+\gamma(L(G31)+L(G13)) \quad (9)$$

Then, the computation of Expression (10) is performed, so that a light control ratio R(G22) at the grid point G22 being a dimming target is calculated. In other words, R(G22)=L(G22)/L'(G22)=0.44, and the light control ratio R(G22) is 0.44.

[Exp. 10]

$$R(G22)=L(G22)/L'(G22) \quad (10)$$

In the process of calculating a light control ratio of the light source at the grid point G02, the computation of Expression (11) is performed, so that a composite grid point illuminance L'(G02) at the grid point G02 is calculated.

[Exp. 11]

$$L'(G02)=L(G02)+\beta L(G03)+\gamma L(G13) \quad (11)$$

Then, the computation of Expression (12) is performed, so that a light control ratio R(G02) at the grid point G02 being a dimming target is calculated. In other words, R(G02)=L(G02)/L'(G02)=0.59, and the light control ratio R(G02) is 0.59.

[Exp. 12]

$$R(G02)=L(G02)/L'(G02) \quad (12)$$

In the generation of the light control information on the group RP2 (FIG. 15), the light sources at the grid points G10, G22, G30, and G32 are light sources being dimming targets. The light control ratio of the light source at the grid point G22 has been calculated for the group RP1, and accordingly, the light control ratio will not be calculated again in the generation of the light control information on the group RP2.

In the process of calculating the light control ratios of the light sources at the grid points G10 and G30, calculations are performed as in the second mode, so that the light control ratio R(G10) of the light source at the grid point G10 and the light control ratio R(G12) of the light source at the grid point G30 are each calculated to be 0.64.

In the process of calculating the light control ratio of the light source at the grid point G32, the computation of Expression (13) is performed, so that a composite grid point illuminance L'(G32) at the grid point G32 is calculated.

[Exp. 13]

$$L'(G32)=L(G32)+\alpha L(G42)+\gamma(L(G41)+L(G23)) \quad (13)$$

Then, the computation of Expression (14) is performed, so that a light control ratio R(G32) at the grid point G32 being a dimming target is calculated. In other words, R(G32)=L(G32)/L'(G32)=0.56, and the light control ratio R(G32) is 0.56.

[Exp. 14]

$$R(G32)=L(G32)/L'(G32) \quad (14)$$

In the generation of the light control information on the group RP3, the light sources at the grid points G20 and G22 are light sources being dimming targets. The light control ratios of the light sources at the grid points G20 and G22 have been calculated for the group RP1, and accordingly, the light control ratios will not be calculated again in light control for the group RP2.

In light control for the group RP4, the light sources at the grid points G01, G22, and G23 are light sources being dimming targets. The light control ratio of the light source at the grid point G22 has been calculated for the group RP1, and accordingly, the light control ratio will not be calculated again in the generation of the light control information on the group RP4.

In the process of calculating the light control ratio of the light source at the grid point G01, the computation of Expression (15) is performed, so that a composite grid point illuminance L'(G01) at the grid point G01 is calculated.

[Exp. 15]

$$L'(G01)=L(G01)+\beta L(G00)+\gamma L(G10) \quad (15)$$

Then, the computation of Expression (16) is performed, so that a light control ratio R(G01) at the grid point G01 being a dimming target is calculated. In other words, R(G01)=L(G01)/L'(G01)=0.59, and the light control ratio R(G01) is 0.59.

[Exp. 16]

$$R(G01)=L(G01)/L'(G01) \quad (16)$$

In the process of calculating the light control ratio of the light source at the grid point G23, the computation of Expression (17) is performed, so that a composite grid point illuminance L'(G23) at the grid point G23 is calculated.

[Exp. 17]

$$L'(G23)=L(G23)+\gamma L(G32) \quad (17)$$

Then, the computation of Expression (18) is performed, so that a light control ratio R(G23) at the grid point G23 being a dimming target is calculated. In other words, R(G23)=L(G23)/L'(G23)=0.82, and the light control ratio R(G23) is 0.82.

[Exp. 18]

$$R(G23)=L(G23)/L'(G23) \qquad (18)$$

As a result of the light control operation in the third mode as described above, as shown in FIG. 16, the to-be-turned-on light sources at the grid points G10, G20, and G30 are each turned on at a light control ratio 0.64 (64%), and the to-be-turned-on light sources at the grid points G01 and G02 are each turned on at a light control ratio 0.59 (59%). The to-be-turned-on light source at the grid point G22 is turned on at a light control ratio 0.44 (44%), the to-be-turned-on light source at the grid point G32 is turned on at a light control ratio 0.56 (56%), and the to-be-turned-on light source at the grid point G23 is turned on at a light control ratio 0.82 (82%).

In the case where a simulation is performed with the light control ratios obtained through the light control operation in the third mode, the illuminance distribution as shown in FIG. 17 is obtained. In FIG. 17, laterally elongated quadrangles each indicate a light. In FIG. 17, relatively large quadrangles surrounding the laterally elongated quadrangle each indicate an occupied location AR. The same holds true for FIGS. 19, 24, and 26 described below. As shown in FIG. 17, it is found that an optimum illuminance (750 lx) suitable for work has been obtained in the occupied location AR.

Figure 18:
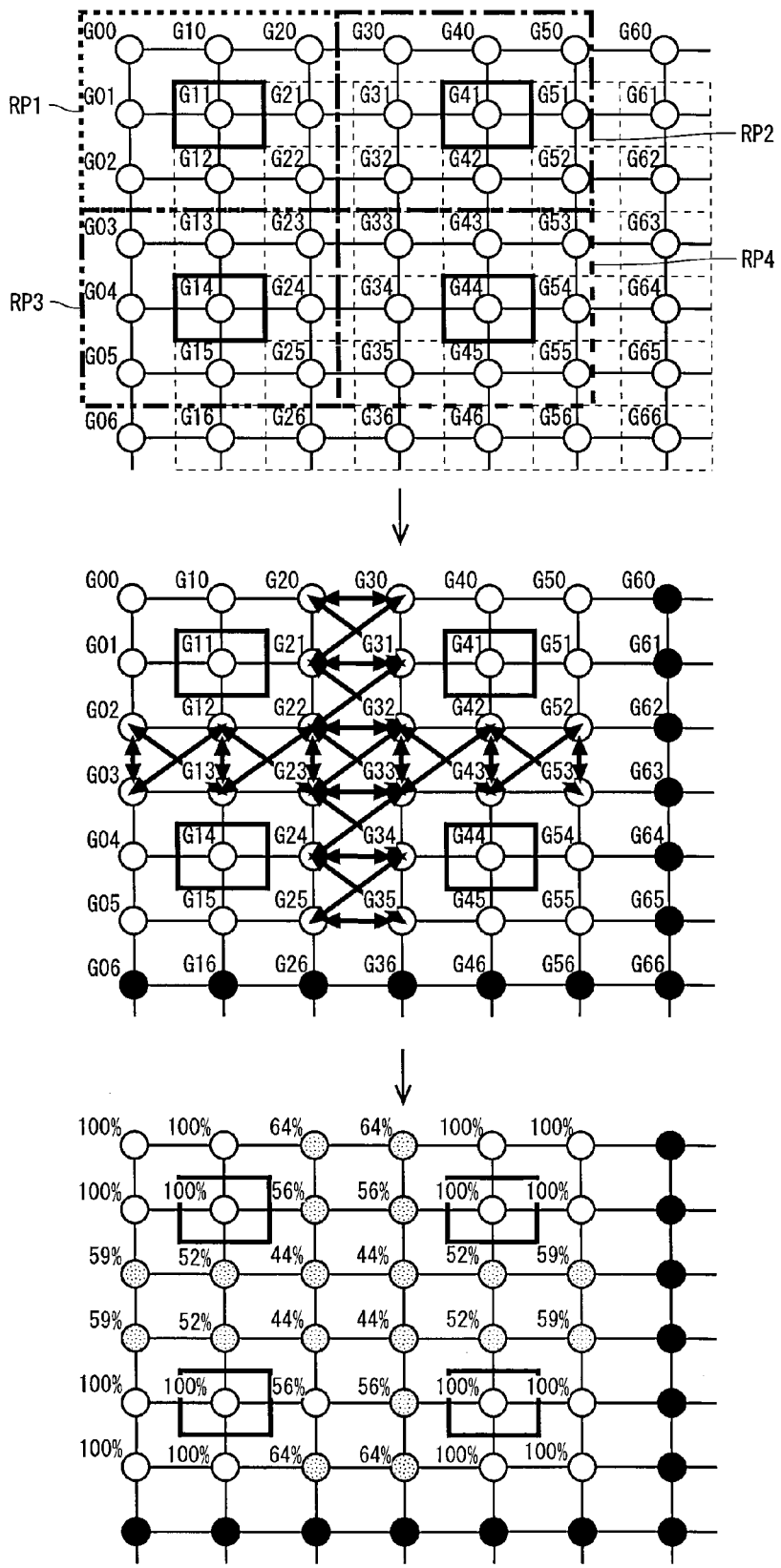
FIG. 18 is a view showing a fourth mode of the light control operation.
Figure 19:
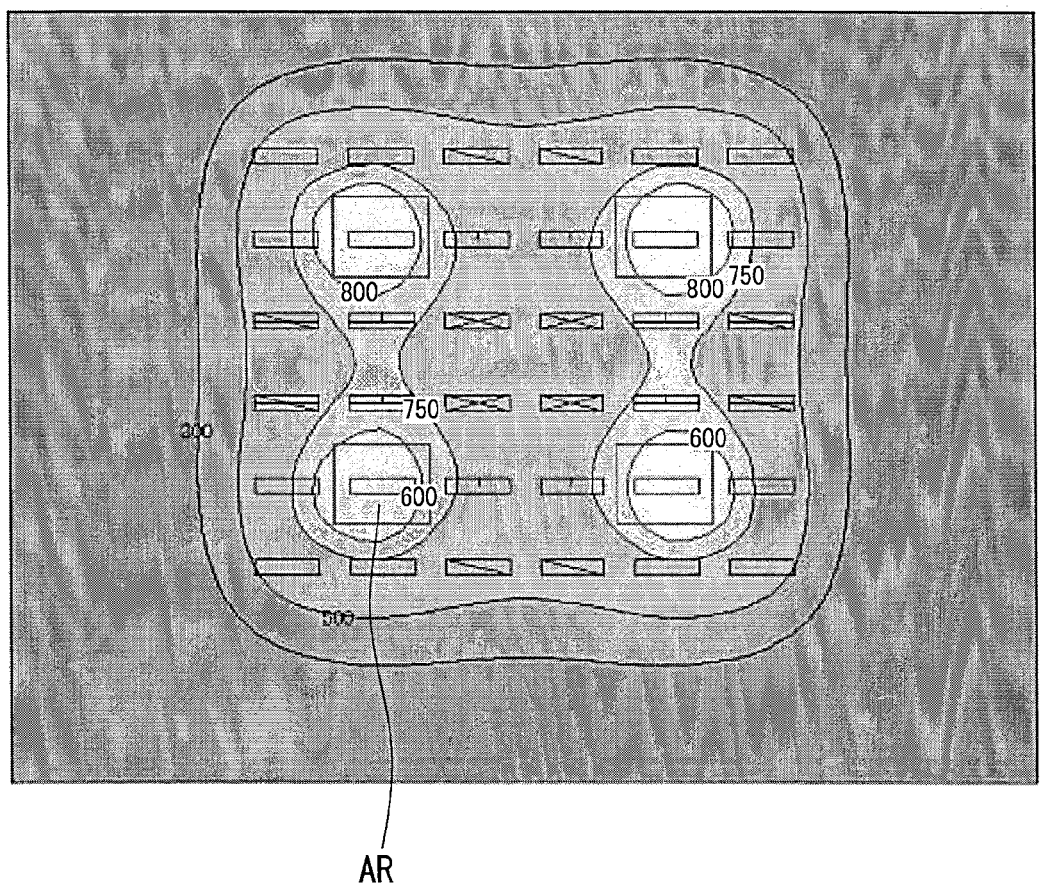
FIG. 19 is a view showing the illuminance distribution in the case where a simulation is performed at a light control ratio obtained through the light control operation in the fourth mode.

Next, a fourth mode of the light control operation in the light control system 1A will be described. FIG. 18 is a view showing the fourth mode of the light control operation. FIG. 19 is a view showing the illuminance distribution in the case where a simulation is performed at the light control ratio obtained through the light control operation in the fourth mode.

In the example of FIG. 18, the occupied locations are grid points G11, G41, G14, and G44.

With reference to FIG. 18, the to-be-turned-on light sources are 36 light sources positioned at grid points G00, G10, G20, G30, G40, G50, G01, G11, G21, G31, G41, G51, G02, G12, G22, G32, G42, G52, G03, G13, G23, G33, G43, G53, G04, G14, G24, G34, G44, G54, G05, G15, G25, G35, G45, and G55.

The light control information on to-be-turned-on light sources is generated per group. In the example of FIG. 18, light control information is generated for a group RP1 centering around the light positioned at the grid point G11, a group RP2 centering around the light source positioned at the grid point G41, a group RP3 centering around the light source positioned at the grid point G14, and a group RP4 centering around the light source positioned at the grid point G44, in the state order.

In the generation of the light control information on the group RP1, the light sources at the grid points G20, G21, G22, G12, and G02 are light sources being dimming targets.

In the process of calculating the light control ratios of the light sources at the grid points G20, G21, G22, G12, and G02, a composite grid point illuminance is calculated for every light source being a dimming target. Then, for every light source being a dimming target, a single grid point illuminance is divided by the composite grid point illuminance, so that the light control ratio of each light source being a dimming target in the group RP1 is calculated.

In the generation of the light control information on the group RP2, the light sources at the grid points G30, G31, G32, G42, and G52 are light sources being dimming targets.

In the process of calculating the light control ratio of each of the light sources at grid points G30, G31, G32, G42, and G52, a composite grid point illuminance is calculated for every dimming target. Then, for every dimming target, a single grid point illuminance is divided by the composite grid point illuminance, so that the light control ratio of each light source being a dimming target in the group RP2 is calculated.

In the generation of the light control information on the group RP3, the light sources at the grid points G03, G13, G23, G24, and G25 are light sources.

In the process of calculating the light control ratio of each of the light sources at the grid points G03, G13, G23, G24, and G25, a composite grid point illuminance is calculated for every light source being a dimming target. Then, a single grid point illuminance is divided by the composite grid point illuminance for every light source being a dimming target, so that the light control ratio of each light source being a dimming target in the group RP3 is calculated.

In the generation of the light control information on the group RP4, the light sources at the grid points G33, G43, G53, G34, and G35 are the light sources being dimming targets.

In the process of calculating the light control ratio of each of the light sources at grid points G33, G43, G53, G34, and G35, a composite grid point illuminance is calculated for every light source being a dimming target. Then, a single grid point illuminance is divided by the composite grid point illuminance for every light source being a dimming target, so that the light control ratio of each light source being a dimming target in the group RP4 is calculated.

As a result of the light control operation in the fourth mode as described above, as shown in FIG. 18, the to-be-turned-on light sources at the grid points G20, G30, G25, and G35 are each turned on at a light control ratio 0.64, and the to-be-turned-on light sources at the grid points G21, G31, G24, and G34 are each turned on at a light control ratio 0.56. The to-be-turned-on light sources at the grid points G22, G32, G23, and G33 are each turned on at a light control ratio 0.44, the to-be-turned-on light sources at the grid points G12, G13, G42, and G43 are each turned on at a light control ratio 0.52, and the to-be-turned-on light sources at the grid points G02, G03, G52, and G53 are each turned on at a light control ratio 0.59.

In the case where a simulation is performed at the light control ratio obtained through the light control operation in the fourth mode, the illuminance distribution as shown in FIG. 19 is obtained, and it is found that an optimum illuminance (750 lx) suitable for work has been obtained in the occupied location AR.

As described above, the light control system 1A includes the lighting devices 10, the motion sensor 30, and the central controller 50. The lighting devices 10 are respectively arranged, on the ceiling surface, at grid points of the ceiling surface partitioned in a grid pattern. The motion sensor 30 detects an occupancy status of seats positioned correspondingly to the positions of the grid points. The central controller 50 can communicate with each of the lighting devices 10 respectively arranged at the grid points. The central controller 50 includes the light-control information generating unit and the transmission unit. The light-control information generating unit generates, for every group that is set correspondingly to each occupied location, the light control information on the lighting device 10 that will become a dimming target in a group, where a block formed of a plurality of grid points centering around the grid point of the occupied location is one group. The transmission unit transmits the light control information. The lighting device being a dimming target among the lighting devices controls light based on the received light control information.

The above-mentioned light control system 1A can automatically perform light control on each lighting device 10 in accordance with an occupancy status without detecting an illuminance per seat in real time, eliminating the need for installing an illuminance sensor per seat. The light control system 1A therefore can reduce the cost required for installing illuminance sensors.

The process of calculating a light control ratio using the averaging process can dim the light of the to-be-turned-on light source while keeping an appropriate illuminance on the working surface in the occupied location, reducing the power consumption of the lighting device 10 without impairing a comfortable illumination environment.

2. Second Embodiment

Next, a second embodiment of the present invention will be described. The light control system 1A according to the first embodiment does not take into account, in the calculation of an illuminance on a working surface at a grid point being a grid point of interest, the effects of light sources at grid points which are positioned with one grid point sandwiched between the grid point of interest and themselves. Meanwhile, a light control system 1B according to the second embodiment takes into account, in the calculation of an illuminance on a working surface at a grid point of interest, the effects of light sources at grid points which are positioned with one grid point sandwiched between the grid point of interest and themselves, on specific conditions. The light control system 1B has the structure and function almost identical to those of the light control system 1A (see FIGS. 1 to 3), and accordingly, the similar parts will be denoted by the same references and will not be described here.

[2-1. Outline of Light Control Technique According to Second Embodiment]

The light control system 1B of the second embodiment further applies the following rule (6) in addition to the rules (1) to (5) similar to those of the light control system 1A of the first embodiment, to thereby generate light control information on a to-be-turned-on light source.

(1) The straight tube light CL is handled as a point light source PL (FIG. 4).

The point light sources PL on the ceiling of an office are respectively arranged at grid points G of a grid (FIG. 5).

(3) Light control is performed with a group formed of nine lights as a basic control unit.

(4) An illuminance ratio is calculated.

In the calculation of an illuminance ratio, as in the first embodiment described above, a reference illuminance is the working surface illuminance at the center grid point in a group when the light source at this center grid point is turned on alone with a rated output. Then, the working surface illuminances at the adjacent grid points adjacent to the center grid point and the working surface illuminances at the grid points adjacently surrounding the adjacent grid points are converted into illuminance ratios to the reference illuminance.

A storage of the central controller 50 preliminarily stores the thus obtained illuminance ratios (first illuminance ratios) of the adjacent grid points and illuminance ratios (second illuminance ratios) of the grid points adjacently surrounding the adjacent grid points to the reference illuminance.

The first illuminance ratios are used to calculate a light control ratio using the averaging process (5) below, and the second illuminance ratio is used to calculate a light control ratio using the subtraction process (6) below. As described above, the illuminances at grid points are represented as the illuminance ratios to the reference illuminance, and a computation is performed using these illuminance ratios. This simplifies the computation, reducing a computation amount.

(5) A light control ratio is calculated through the averaging process.

(6) A light control ratio is calculated through the subtraction process.

The subtraction process is used, in calculating an illuminance on a working surface at a grid point of interest, to correct the illuminance at the grid point of interest by taking into account the light quantity received from light sources at grid points which are positioned with one grid point sandwiched between the grid point of interest and themselves.

The light quantity received from the light source (remote light source) which is positioned with one grid point sandwiched between a grid point of interest and itself is normally small, and thus, the first embodiment ignores the light quantity received from the remote light source. However, an increase in the number of light sources, which may even be the light sources positioned relatively apart from a grid point of interest, leads to an increase in the light quantity received from the remote light sources at the grid point of interest.

Figure 20:
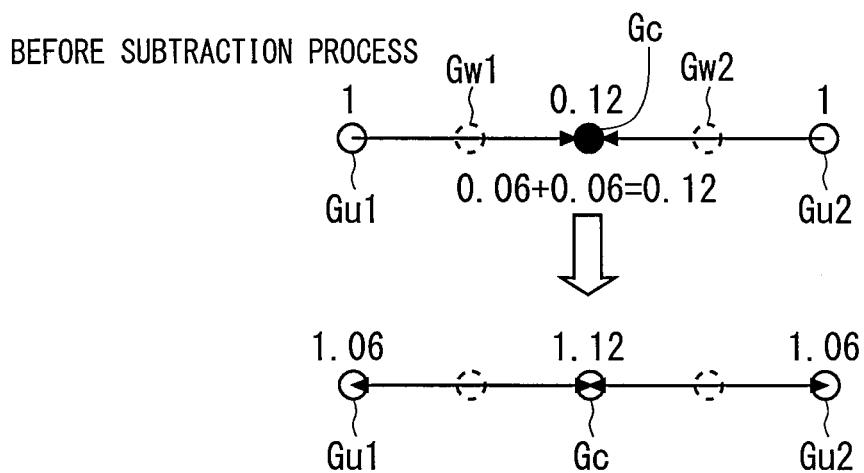
FIG. 20 is a diagram showing an outline of a subtraction process.
Figure 21:
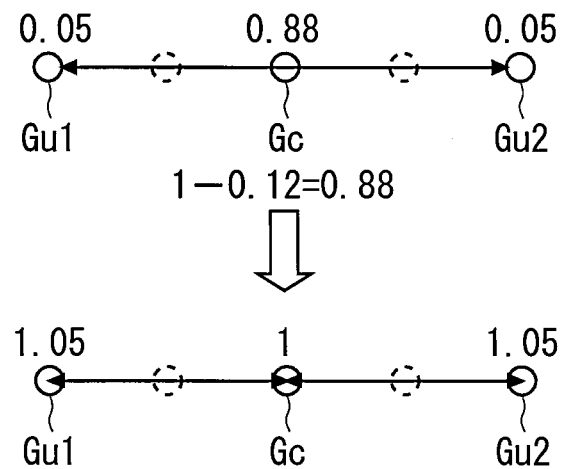
FIG. 21 is another diagram showing the outline of the subtraction process.

This embodiment therefore performs the subtraction process into which the light quantity received from remote light sources is taken account, to calculate the light control ratios of to-be-turned-on light sources. FIGS. 20 and 21 are views showing the outline of the subtraction process.

As shown in FIG. 20, in the case where the light sources at grid points Gu1 and Gu2, which are positioned with grid points Gw1 and Gw2 sandwiched between a center grid point Gc and themselves, are turned on with a rated output, a composite grid point illuminance at the center grid point Gc is 0.12. Thus, in the case where the light source at the center grid point Gc and the light sources at the grid points Gu1 and Gu2 are simultaneously turned with a rated output, the composite grid point illuminance at the center grid point Gc is 1.12, and the composite grid point illuminance at the grid points Gu1 and Gu2 is 1.06.

The extra illuminance received at the center grid point Gc from the remote light sources at the grid points Gu1 and Gu2 is 0.12 as described above. Thus, the extra illuminance "0.12" caused by the remote light sources at the grid points Gu1 and Gu2 is subtracted from a single grid point illuminance "1" at the center grid point Gc, to thereby calculate the light control ratio at the center grid point Gc. As a result of the subtraction process described above, the light control ratio at the center grid point Gc is calculated to be 0.88 (see FIG. 21).

In the case where the light source at the center grid point Gc is turned on at the obtained light control ratio and the light sources at the grid points Gu1 and Gu2 are turned on with a rated output, the composite grid point illuminance at the center grid point Gc is 1, and the composite grid point illuminance at the grid points Gu1 and Gu2 is 1.05.

As described above, the subtraction process of subtracting an extra illuminance caused by remote light sources from a single grid point illuminance at a grid point of interest is performed, to thereby calculate the light control ratio at the grid point of interest. This achieves the composite grid point illuminance of 1 at the grid point of interest while reducing an extra illuminance.

[2-2. Light Control Operation]

Figure 23:
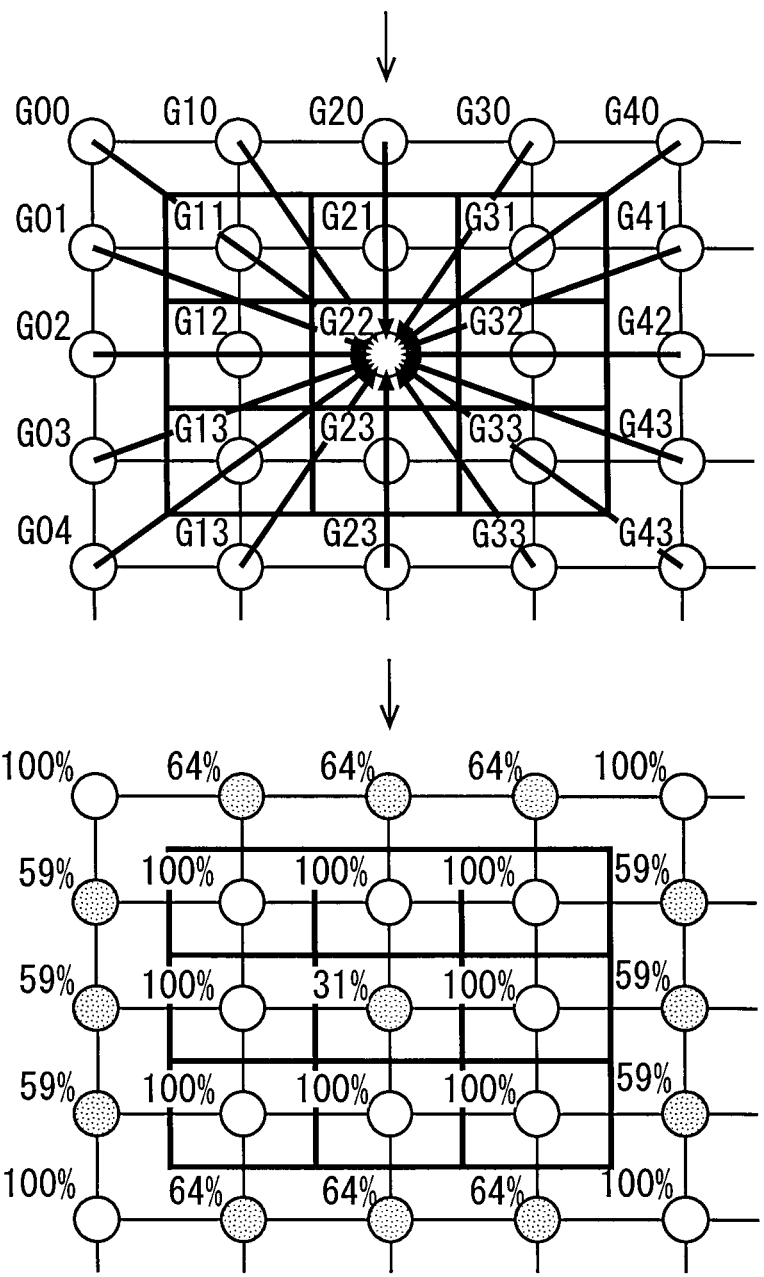
FIG. 23 is another view showing the first mode of the light control operation in the light control system according to the second embodiment.

Next, the light control operation in the light control system 1B will be described. FIGS. 22 and 23 are views showing a first mode of the light control operation in the light control system 1B. FIG. 24 is a view showing the illuminance distribution in the case where a simulation is performed at the light control ratio obtained through the light control operation in the first mode.

In the light control operation in the light control system 1B, first, a complete round of the process of calculating a light control ratio using the averaging process similar to that of the first embodiment is performed.

To be specific, in the example of FIG. 22, the occupied locations are grid points G11, G21, G31, G12, G22, G32, G13, G23, and G33.

Based on such occupancy statuses, the to-be-turned-on light sources in the office are determined as 25 light sources at grid points G00, G10, G20, G30, G40, G01, G11, G21, G31, G41, G02, G12, G22, G32, G42, G03, G13, G23, G33, G43, G04, G14, G24, G34, and G44.

Then, for each group including nine light sources, the process of calculating a light control ratio is performed on each of the to-be-turned-on light sources using the averaging process. In the example of FIG. 22, the process of calculating a light control ratio using the averaging process is performed on a group centering around the light positioned at the grid point G11, a group centering around the light source positioned at the grid point G21, a group centering around the light source positioned at the grid point G31, a group centering around the light source positioned at the grid point G12, a group centering around the light source positioned at the grid point G22, a group centering around the light source positioned at the grid point G32, a group centering around the light source positioned at the grid point G13, a group centering around the light source positioned at the grid point G23, and a group centering around the light source positioned at the grid point G33, in the stated order.

As a result of the process of calculating a light control ratio using the averaging process, the light control ratio at each of the light sources at the grid points G10, G20, G30, G14, G24, and G34 is calculated to be 0.64 (FIG. 22). In other words, R(G10)=R(G20)=R(G30)=R(G14)=R(G24)=R(G34)=0.64. Also, the light control ratio of each of the light sources at the grid points G01, G02, G03, G41, G42, and G43 is calculated to be 0.59 (FIG. 22). In other words, R(G01)=R(G02)=R(G03)=R(G41)=R(G42)=R(G43)=0.59.

As described above, in the light control operation in the light control system 1B, a complete round of the process of calculating a light control ratio using the averaging process similar to that of the first embodiment is performed, so that the light control ratio of each light source is calculated once.

Then, after the process of calculating a light control ratio using the averaging process is complete, the light-control information generating unit performs the process of calculating a light control ratio using the subtraction process.

In the process of calculating a light control ratio using the subtraction process, first, it is judged whether or not a specific group in which the seats at all the grid points included therein are occupied (which is also referred to as "all occupied group") exists in the above-mentioned groups include.

If a specific group in which the seats at all the grid points included therein are occupied exists, the process of calculating a light control ratio using the subtraction process is performed, where the light source at the center grid point in the specific group being regarded as the light source is a dimming target.

In other words, the light-control information generating unit has the functions as a judgment section that judges whether or not a specific group in which the seats at all the grid points included therein are occupied exists in the groups set correspondingly to the occupied locations, and as a second light-control processing section that calculates the light control ratio of a light source at the center grid point in the specific group using the subtraction process.

For example, in the example of FIG. 23, the occupied locations are the grid points G11, G21, G31, G12, G22, G32, G13, G23, and G33, and accordingly, a group centering around the light source positioned at the grid point G22 is a specific group RPs. Also, the light source at the center grid point G22 in the specific group RPs becomes the light source being a dimming target, and accordingly, the process of calculating a light control ratio using the subtraction process is performed on the light source at the grid point G22.

In the process of calculating a light control ratio using the subtraction process, first, an illuminance (cumulative grid point illuminance) at the grid point G22 is calculated. The cumulative grid point illuminance is obtained by adding the illuminances respectively received from the light sources (adjacent-to-group light sources) outside of the specific group RPs, which are each adjacent to any light source in the specific group RPs.

To be specific, a cumulative grid point illuminance F(G22) at the grid point G22 is represented as Expression (19), using single grid point illuminances L(Gxy) and light control ratios R(Gxy) at the grid points that are calculated using the averaging process.

[Exp. 19]

$$F(G22) = 0.02 \times \{L(G00) + L(G40) + L(G04) + L(G44)\} + \\ 0.09 \times \{R(G10) \cdot L(G10) + R(G30) \cdot L(G30) + \\ R(G14) \cdot L(G14) + R(G34) \cdot L(G34)\} + \\ 0.13 \times \{R(G20) \cdot L(G20) + R(G24) \cdot L(G24)\} + \\ 0.06 \times \{R(G01) \cdot L(G01) + R(G02) \cdot L(G02) + R(G03) \cdot L(G03) + \\ R(G41) \cdot L(G41) + R(G42) \cdot L(G42) + R(G43) \cdot L(G43)\} \quad (19)$$

From Expression (19), the cumulative grid point illuminance F(G22) at the grid point G22 is 0.69.

The light control ratio R(G22) of the light source at the grid point G22 is calculated to be 1−0.69=0.31 through the computation of Expression (20) in which the cumulative grid point illuminance F(G22) at the grid point G22 is subtracted from a single grid point illuminance L(G22) at the grid point G22.

[Exp. 20]

$$R(G22)=L(G22)-F(G22) \quad (20)$$

As described above, in the light control operation in the light control system 1B, a complete round of the process of calculating a light control ratio using the averaging process is performed to calculate once a light control ratio of each light source, and then, the process of calculating a light control ratio using the subtraction process is performed. Through the process of calculating a light control ratio using the subtraction process, the light control ratio of the to-be-turned-on light source at the grid point G22 is calculated to be 0.31, and as shown in FIG. 23, the to-be-turned-on light source at the grid point G22 is turned on at the light control ratio 0.31.

In the case where a simulation is performed at the light control ratio obtained through the light control operation in the first mode in the light control system 1B, the illuminance distribution as shown in FIG. 24 is obtained, and it is found that an optimum illuminance (750 lx) suitable for work has been obtained at nine center occupied locations AR.

Figure 25:
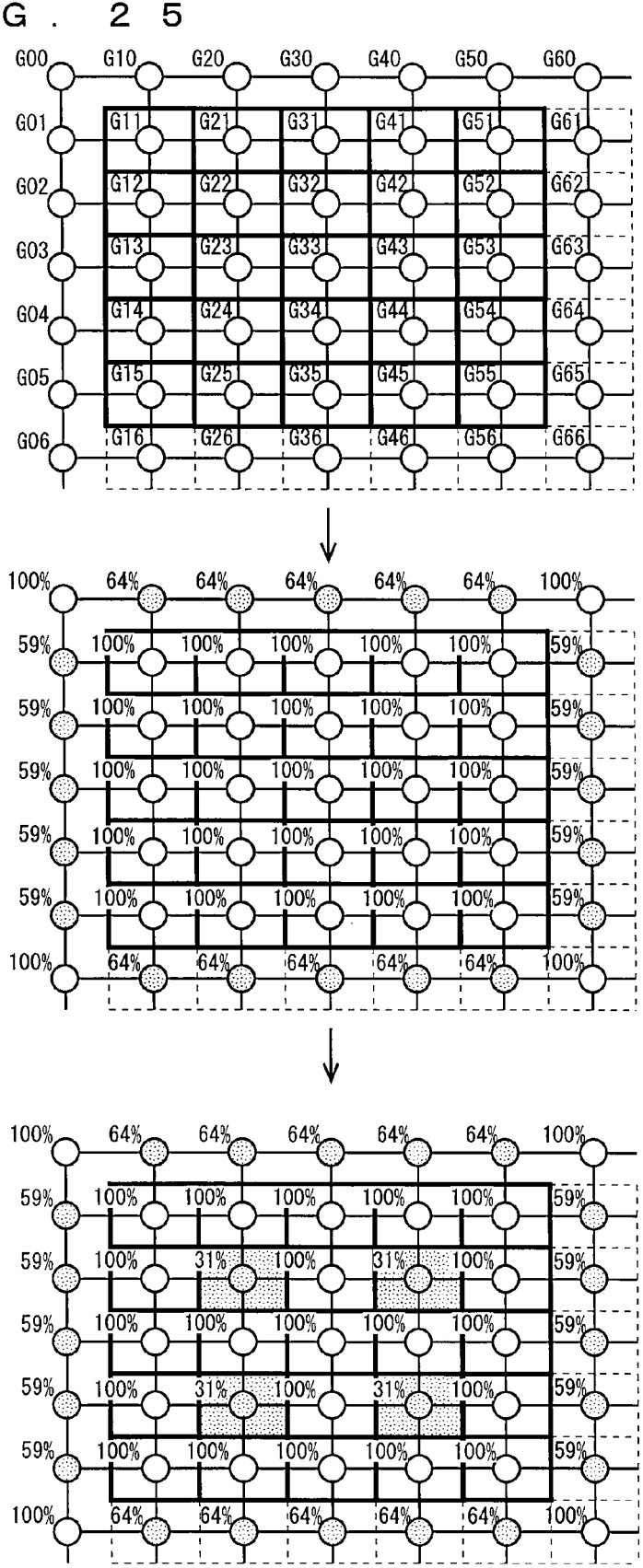
FIG. 25 is a view showing a second mode of the light control operation in the light control system according to the second embodiment.

Next, a second mode of the light control operation in the light control system 1B will be described. FIG. 25 is a view showing the second mode of the light control operation. FIG. 26 is a view showing the illuminance distribution in the case where a simulation is performed at the light control ratio obtained through the light control operation in the second mode.

In the example of FIG. 25, the occupied locations are grid points G11, G21, G31, G41, G51, G12, G22, G32, G42, G52, G13, G23, G33, G43, G53, G14, G24, G34, G44, G54, G15, G25, G35, G45, and G55.

With reference to FIG. 26, the to-be-turned-on light sources are 49 light sources positioned at grid points G00, G10, G20, G30, G40, G50, G60, G01, G11, G21, G31, G41, G51, G61, G02, G12, G22, G32, G42, G52, G62, G03, G13, G23, G33, G43, G53, G63, G04, G14, G24, G34, G44, G54, G64, G05, G15, G25, G35, G45, G55, G65, G06, G16, G26, G36, G46, G56, and G66.

The process of calculating a light control ratio using the averaging process is first performed on those to-be-turned-on light sources in units of groups.

Through the calculation process using the averaging process, the light control ratios of the light sources at the grid points G10, G20, G30, G40, G50, G16, G26, G36, G46, and G56 are each calculated to be 0.64 (FIG. 25). The light control ratios of the light sources at the grid points G01, G02, G03, G04, G05, G61, G62, G63, G64, and G65 are each calculated to be 0.59 (FIG. 25).

As described above, in the light control operation in the light control system 1B, a complete round of the process of calculating a light control ratio using the averaging process similar to that of the first embodiment is performed, so that a light control ratio of each light source is calculated once.

Then, after the process of calculating a light control ratio using the averaging process is complete, the process of calculating a light control ratio using the subtraction process is performed.

In the process of calculating a light control ratio using the subtraction process, first, it is judged whether or not a specific group in which the seats at all the grid points included therein are occupied (which is also referred to as "all occupied group") exists in the groups which have undergone the process of calculating a light control ratio using the averaging process.

Then, if a specific group in which the seats at all the grid points included therein are occupied exists, the process of calculating a light control ratio using the subtraction process is performed, where the light source at the center grid point in the specific group being regarded as the light source is a dimming target.

Whether or not a specific group exists is judged from the upper-left grid point to the lower-right grid point sequentially in a raster order, and every time a specific group is found, the subtraction process is performed on the found specific group. Once the subtraction process is performed, the grid point of the light source that has undergone the subtraction process is treated as a vacant seat. In other words, the group including the light source that has undergone the subtraction process is treated as a non-specific group and is then excluded from the targets for the subtraction process.

In the example of FIG. 25, the occupied locations are the grid points G11, G21, G31, G41, G51, G12, G22, G32, G42, G52, G13, G23, G33, G43, G53, G14, G24, G34, G44, G54, G15, G25, G35, G45, and G55.

For this reason, the group centering around the light source positioned at the grid point G22 is a specific group RPs, and the subtraction process is performed in which the light source at the center grid point G22 in the specific group RPs is the light source being a dimming target.

After the subtraction process on the light source at the grid point G22 is complete, the grid point G22 is treated as a vacant seat, and accordingly, the group including the light source at the grid point G22 becomes a non-specific group. For example, the group centering around the light source at the grid point G32 includes the grid point G22 treated as a vacant seat and thus becomes a non-specific group, which is excluded from the targets for the subtraction process.

Then, the group centering around the light source at the grid point G42 becomes a specific group, and the subtraction process is performed in which the light source at the center grid point G42 in the specific group is the light source being a dimming target.

After that, the group centering around the light source at the grid point G24 and the group centering around the light source at the grid point G44 each become a specific group, and the subtraction process is performed on the two specific groups.

In the second mode, to simplify the computation of the subtraction process, the light control ratio 0.31, which has been obtained through the process of calculating a light control ratio using the subtraction process in the first mode, is used as a basic value obtained through the subtraction process. In other words, the light control ratio 0.31 calculated through the subtraction process in the first mode is employed uniformly as the light control ratios at the grid points G22, G42, G24, and G44.

In other words, the light control ratios of the to-be-turned-on light sources at the grid points G22, G42, G24, and G44 are each calculated to be 0.31 through the process of calculating a light control ratio using the subtraction process, and as shown in FIG. 25, the to-be-turned-on light sources at the grid points G22, G42, G24, and G44 are each turned on at a light control ratio 0.31.

In the case where a simulation is performed at the light control ratios obtained through the light control operation in the second mode in the light control system 1B, the illuminance distribution as shown in FIG. 26 is obtained, and it is found that an optimum illuminance (750 lx) suitable for work has been obtained in the 25 center occupied locations AR.

As described above, in the light control operation in the light control system 1B, a complete round of the process of calculating a light control ratio using the averaging process is performed, and once the light control ratio of each light source is calculated, the process of calculating a light control ratio using the subtraction process is performed. As described above, the process of calculating a light control ratio using the subtraction process is performed in addition to the process of calculating a light control ratio using the averaging process, so that the light of the to-be-turned-on light sources can be dimmed further while keeping an appropriate illuminance on the working surfaces of the occupied locations. This further reduces the power consumption of the lighting device 10 without impairing a comfort illumination environment.

<3. Modifications>

While the embodiments of the light control systems 1A and 1B have been described, the present invention is not limited to the description above.

For example, an occupancy status is detected with the motion sensor 30 in the embodiments above, which is not limited thereto.

As a specific example, an occupancy status may be detected via a LAN using the operating condition of a PC placed on each working surface such that the central controller 50 detects an occupancy status based on the operating condition of the PC. Alternatively, an occupancy status may be detected with a passive sensor (infrared sensor), which is provided to each PC placed on each working surface. Still alternatively, an occupancy status may be detected with a pressure sensor, which is provided to each seat to detect.

Light control is performed with a group including nine light sources as a basic control unit in the embodiments above, which is not limited thereto. Light control may be performed with a group including 25 light sources as a basic control unit.

The embodiments above have described as an example the case in which the straight tube light CL is treated as a point light source, which is not limited thereto. For example, LED lamps come in square-shaped and round-shaped lights, and these lights can also be treated as point light sources. As described above, the illuminance on each working surface when the square-shaped or round-shaped light is a point light source can be calculated by the point-by-point method using a light distribution curve.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS 1A, 1B light control system
10 lighting device
11 lighting fixture
12 communication control module
15 power line
30 motion sensor
31 communication module
50 central controller
51 communication control unit
52 CPU (light-control information generating unit)
53 memory

The invention claimed is:

1. A light control system comprising:
a plurality of lighting devices respectively arranged, on a ceiling surface, at a plurality of grid points of said ceiling surface partitioned in a grid pattern;
a sensor that detects occupancy statuses of a plurality of seats located correspondingly to positions of said plurality of grid points; and
a controller capable of communicating with each of said plurality of lighting devices, wherein
said controller
generates, for each of groups set correspondingly to occupied locations, light control information on a lighting device that becomes a dimming target in each of said groups, where a block formed of a plurality of grid points, which center around a grid point of an occupied location and include at least four grid points positioned diagonally to the grid point of the occupied location, is one group,
for each of said groups, calculates ratios of a first illuminance of the centered around grid point being turned on to second illuminances of other grid points being turned off adjacent to the centered around grid point, and
transmits said light control information derived from the calculated ratios, and
a lighting device being a dimming target among said plurality of lighting devices performs light control based on said received light control information.

2. The light control system according to claim 1, wherein said controller determines, among said plurality of lighting devices, a lighting device at each of grid points included in each of said groups as a to-be-turned-on light; and
specifies, for each of said groups, a lighting device adjacent to another to-be-turned-on light at a grid point outside of said group as said lighting device being a dimming target among the lighting devices at grid points in each of said groups.

3. The light control system according to claim 2, wherein in a case where a reference illuminance represents an illuminance on an illumination surface at a grid point at which a lighting device being a dimming target when said lighting device being a dimming target is turned on alone with a rated output, said controller calculates said ratios such that a composite illuminance approaches said reference illuminance, said composite illuminance being obtained by adding an illuminance on said illumination surface provided from said lighting device being a dimming target and an illuminance on said illumination surface provided from said another to-be-turned-on light adjacent to said lighting device being a dimming target.

4. The light control system according to claim 3, wherein said controller preliminarily stores, as first illuminance ratios, ratios of an illuminance on an illumination surface at a grid point and an illuminance on an illumination surface at each adjacent grid point adjacent to said grid point, which are obtained when a lighting device at said grid point is turned on alone with a rated output, to said reference illuminance, and obtains said composite illuminance using said first illuminance ratios to calculate said light control ratio such that said composite illuminance approaches one being said first illuminance ratios of said reference illuminance.

5. The light control system according to claim 3, wherein the block as said group is formed of a grid point at an occupied location and eight grid points adjacent to said grid point,
said controller judges whether or not a specific group, which is said group in which seats at the grid points included therein are all occupied, exists, calculates, in a case where said specific group exists, a light control ratio of a lighting device at a center grid point positioned at the center of said specific group as said light control information,
obtains a cumulative illuminance being an accumulation of illuminances on an illumination surface at said center grid point, said illuminances being respectively provided from to-be-turned-on lights at grid points that are adjacent to any of grid points in said specific group and are not included in said specific group, and
calculates, as a light control ratio of the lighting device at said center grid point, a ratio of a value obtained by subtracting said cumulative illuminance from said reference illuminance to said reference illuminance.

6. The light control system according to claim 5, wherein said controller preliminarily stores, as second illuminance ratios, ratios of an illuminance on an illumination surface at a grid point and an illuminance on an illumination surface at each of grid points that adjacently surround each adjacent grid point adjacent to said grid point, which are obtained when a lighting device at said grid point is turned on alone with a rated output, to said reference illuminance, and
obtains said cumulative illuminance using said second illuminance ratios to calculate, as a light control ratio of the lighting device at said center grid point, a value obtained by subtracting said cumulative illuminance from one being the second illuminance ratios of said reference illuminance.

7. A light control method for a plurality of lighting devices respectively arranged, on a ceiling surface, at a plurality of grid points of said ceiling surface partitioned in a grid pattern, the method comprising the steps of:
   a) detecting occupancy statuses of a plurality of seats located correspondingly to positions of said plurality of grid points;
   b) generating, for each of groups set correspondingly to occupied locations, light control information on a lighting device that becomes a dimming target in each of said groups, where a block formed of a plurality of grid points, which center around a grid point of an occupied location and include at least four grid points positioned diagonally to the grid point of the occupied location, is one group;
   c) for each of said groups, calculating ratios of a first illuminance of the centered around grid point being turned on to second illuminances of other grid points being turned off adjacent to the centered around grid point; and
   d) performing light control on the lighting device being a dimming target based on said received light control information derived from the calculated ratios.

8. A non-transitory computer-readable memory storing a program that causes a computer built in a controller of a light control system including: a plurality of lighting devices respectively arranged, on a ceiling surface, at a plurality of grid points of said ceiling surface partitioned in a grid pattern; a sensor that detects occupancy statuses of a plurality of seats positioned correspondingly to positions of said plurality of grid points; and said controller capable of communicating with each of said plurality of lighting devices, to perform the steps of:
   a) determining, when a block formed of a plurality of grid points, which center around a grid point of an occupied location and include at least four grid points positioned diagonally to the grid point of the occupied location, is a constitutional unit of one group, a lighting device at each of grid points included in each of groups set correspondingly to occupied locations as a to-be-turned-on light among said plurality of lighting devices; and
   b) for each of said groups, calculating ratios of a first illuminance of the centered around grid point being turned on to second illuminances of other grid points being turned off adjacent to the centered around grid point.

* * * * *